United States Patent
Li et al.

(10) Patent No.: US 11,899,320 B2
(45) Date of Patent: Feb. 13, 2024

(54) ARRAY SUBSTRATE AND LIQUID CRYSTAL DISPLAY PANEL

(71) Applicant: BOE Technology Group Co., Ltd., Beijing (CN)

(72) Inventors: Hongpeng Li, Beijing (CN); Pengxia Liang, Beijing (CN); Zheng Fang, Beijing (CN); Ge Shi, Beijing (CN); Hyunsic Choi, Beijing (CN); Yanliu Sun, Beijing (CN); Jiahui Han, Beijing (CN); Song Yang, Beijing (CN); Yujie Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 132 days.

(21) Appl. No.: 17/613,039

(22) PCT Filed: Jan. 29, 2021

(86) PCT No.: PCT/CN2021/074483
§ 371 (c)(1),
(2) Date: Nov. 19, 2021

(87) PCT Pub. No.: WO2022/160282
PCT Pub. Date: Aug. 4, 2022

(65) Prior Publication Data
US 2023/0090555 A1    Mar. 23, 2023

(51) Int. Cl.
*G02F 1/1343* (2006.01)
*G02F 1/1335* (2006.01)

(52) U.S. Cl.
CPC .... *G02F 1/134309* (2013.01); *G02F 1/13439* (2013.01); *G02F 1/133514* (2013.01)

(58) Field of Classification Search
None
See application file for complete search history.

(56) References Cited

U.S. PATENT DOCUMENTS

| 7,499,136 | B2 | 3/2009 | Kubo |
| 10,663,804 | B2 | 5/2020 | Murata et al. |
| 2001/0024257 | A1 | 9/2001 | Kubo et al. |
| 2003/0112398 | A1 | 6/2003 | Kim et al. |
| 2005/0174528 | A1 | 8/2005 | Kubo et al. |

(Continued)

FOREIGN PATENT DOCUMENTS

| CN | 1359025 A | 7/2002 |
| CN | 1932621 A | 3/2007 |

(Continued)

OTHER PUBLICATIONS

Written Opinion of International Application No. PCT/CN2021/074483 dated Nov. 4, 2021, (3p).

(Continued)

*Primary Examiner* — Ryan Crockett
(74) *Attorney, Agent, or Firm* — Arch & Lake LLP

(57) ABSTRACT

The present disclosure provides an array substrate and a liquid crystal display panel, belonging to the file of display technology. The array substrate includes a base substrate, a first electrode, an insulating dielectric layer and a second electrode stacked in sequence; the second electrode is provided with at least one hollow hole, and the hollow hole is in a shape of convex polygon, circle or ellipse.

18 Claims, 27 Drawing Sheets

(56) References Cited

U.S. PATENT DOCUMENTS

| | | | |
|---|---|---|---|
| 2005/0237463 A1 | 10/2005 | Kubo | |
| 2007/0165175 A1* | 7/2007 | Kazuyoshi | G02F 1/134309 349/141 |
| 2007/0195251 A1* | 8/2007 | Lu | G02F 1/1393 349/143 |
| 2009/0135361 A1 | 5/2009 | Lu et al. | |
| 2016/0252781 A1* | 9/2016 | Chai | G02F 1/1368 349/43 |
| 2019/0107759 A1 | 4/2019 | Murata et al. | |
| 2019/0346718 A1 | 11/2019 | Liu et al. | |
| 2022/0121055 A1* | 4/2022 | Yu | G02F 1/13394 |
| 2022/0291785 A1* | 9/2022 | Adachi | G02F 1/13439 |
| 2023/0004052 A1* | 1/2023 | Komitov | G02F 1/134381 |
| 2023/0255088 A1* | 8/2023 | Hai | H10K 59/80 257/40 |

FOREIGN PATENT DOCUMENTS

| | | |
|---|---|---|
| CN | 1991462 A | 7/2007 |
| CN | 101086590 A | 12/2007 |
| CN | 101916002 A | 12/2010 |
| CN | 104330928 A | 2/2015 |
| CN | 104849927 A | 8/2015 |
| CN | 106405952 A | 2/2017 |
| CN | 106597731 A | 4/2017 |
| CN | 107976831 A | 5/2018 |
| CN | 108020929 A | 5/2018 |
| CN | 108139639 A | 6/2018 |
| CN | 108594544 A | 9/2018 |
| CN | 108873502 A | 11/2018 |
| CN | 104849927 B | 2/2019 |
| CN | 208922014 U | 5/2019 |
| CN | 107976831 B | 10/2020 |
| CN | 108594544 B | 4/2021 |
| CN | 1338655 A | 3/2022 |
| KR | 20010004543 A | 1/2001 |
| KR | 20080084490 A | 9/2008 |
| KR | 101426287 B1 | 8/2014 |
| TW | I571686 B | 2/2017 |
| TW | 201814380 A | 4/2018 |
| TW | I640823 B | 11/2018 |
| TW | 201917474 A | 5/2019 |

OTHER PUBLICATIONS

Search Report for EP application 21921885.6 dated Aug. 9, 2023, 6 pages.

* cited by examiner

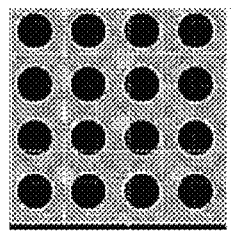 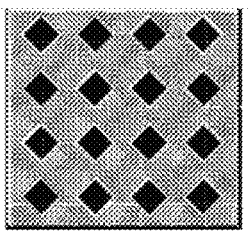 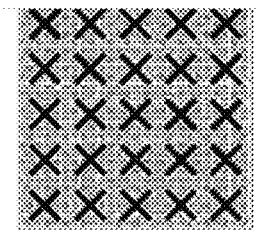 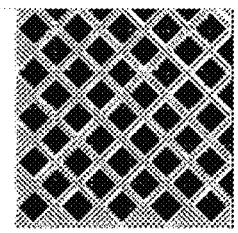
FIG. 13-1  FIG. 13-2  FIG. 13-3  FIG. 13-4
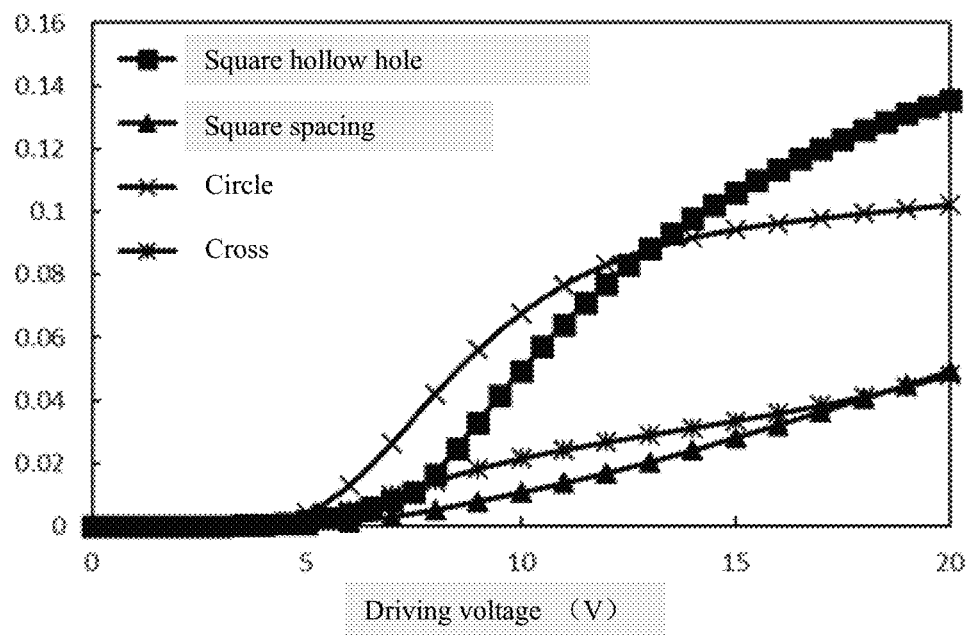
FIG. 14
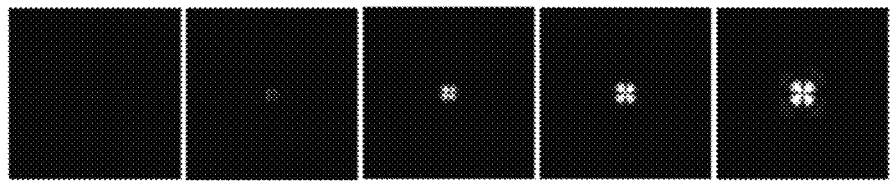
FIG. 15-1  FIG. 15-2  FIG. 15-3  FIG. 15-4  FIG. 15-5
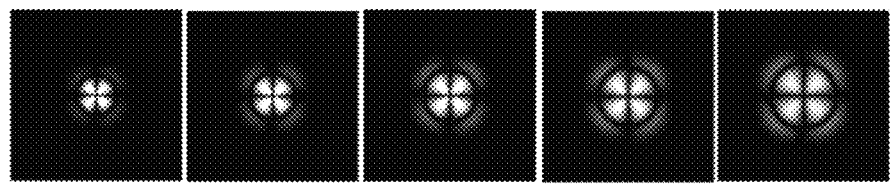
FIG. 15-6  FIG. 15-7  FIG. 15-8  FIG. 15-9  FIG. 15-10

ARRAY SUBSTRATE AND LIQUID CRYSTAL DISPLAY PANEL

CROSS-REFERENCE TO RELATED APPLICATIONS

This application is based upon and claims priority to International Application No. PCT/CN2021/074483, filed on Jan. 29, 2021, the entire contents thereof are incorporated herein by reference.

TECHNICAL FIELD

The present disclosure relates to the technical field of display, and in particular, to an array substrate and a liquid crystal display panel.

BACKGROUND

The ADS (Advanced Super Dimension Switch) display panel includes an array substrate and a color filter substrate disposed opposite to each other to form a cell, and a liquid crystal layer sandwiched between the array substrate and the color filter substrate. The array substrate usually includes a base substrate, a plate electrode and a slit electrode which are stacked in sequence, a fringe electric field can be generated between the slit electrode and the plate electrode; the liquid crystal in the liquid crystal layer is deflected under the drive of the fringe electric field.

It should be noted that the information disclosed in the background art section above is only used to enhance the understanding of the background of the present disclosure, and therefore may include information that does not constitute the prior art known to those of ordinary skill in the art.

SUMMARY

According to one aspect of the present disclosure, an array substrate is provided. The array substrate includes a base substrate, a first electrode, an insulating dielectric layer and a second electrode stacked in sequence; the second electrode is provided with at least one hollow hole, and the hollow hole is in a shape of convex polygon, circle or ellipse.

According to an embodiment of the present disclosure, the hollow hole is in a shape of a regular polygon or a circle.

According to an embodiment of the present disclosure, the hollow hole is in a shape of a circle, a diameter of the hollow hole is in a range of 10 µm to 14 µm.

According to an embodiment of the present disclosure, the hollow hole is in a shape of a square, a size of an edge of the hollow hole is in a range of 9 µm to 13 µm.

According to an embodiment of the present disclosure, the hollow hole includes first hollow holes, and a distance between two adjacent first hollow holes is in a range of 2 µm to 4 µm.

According to an embodiment of the present disclosure, the first hollow holes are arranged into at least one hollow hole row, and the hollow hole row includes a plurality of the first hollow holes successively adjacent and arranged linearly along a first direction; the first direction is parallel to a plane where the base substrate is located.

According to an embodiment of the present disclosure, the first hollow holes are arranged into at least one hollow hole column, and the hollow hole column includes a plurality of the first hollow holes successively adjacent and arranged linearly along a second direction; the second directions is parallel to the plane where the base substrate is located and intersect with the first direction.

According to an embodiment of the present disclosure, an included angle between the first direction and the second direction is 90° or 60°.

According to an embodiment of the present disclosure, the hollow hole is in a shape of a square; an included angle between an edge of the hollow hole and the first direction is in the range of 0° to 10°.

According to an embodiment of the present disclosure, an included angle between the first direction and the second direction is 90°; the hollow hole is in a shape of a square; a length of an edge of the hollow hole is 11 µm, a distance between centers of two adjacent first hollow holes is 14 µm.

According to an embodiment of the present disclosure, an included angle between the first direction and the second direction is 90°; the hollow hole is in a shape of a square; a length of an edge of the hollow hole is 9 µm, a distance between centers of two adjacent first hollow holes is 11 µm.

According to an embodiment of the present disclosure, an included angle between the first direction and the second direction is 60°; the hollow hole is in a shape of a square; a length of an edge of the hollow hole is 10 µm, a distance between centers of two adjacent first hollow holes is 13 µm.

According to an embodiment of the present disclosure, an included angle between the first direction and the second direction is 90°; the hollow hole is in a shape of a circle; a diameter of the hollow hole is 11 µm, a distance between centers of two adjacent first hollow holes is 14 µm.

According to an embodiment of the present disclosure, an included angle between the first direction and the second direction is 60°; the hollow hole is in a shape of a circle; a diameter of the hollow hole is 13 µm, a distance between centers of two adjacent first hollow holes is 16 µm.

According to an embodiment of the present disclosure, the hollow hole further includes a second hollow hole, and the second hollow hole is disposed close to an outer edge of the second electrode; a distance between the second hollow hole and an adjacent first hollow hole is smaller than a distance between two adjacent first hollow holes.

According to an embodiment of the present disclosure, the first hollow holes are arranged into at least one hollow hole row and at least one hollow hole column; the hollow hole row includes a plurality of first hollow holes that are successively adjacent and arranged linearly along a first direction; the hollow hole column includes a plurality of first hollow holes that are successively adjacent and arranged linearly along a second direction; the first direction and the second direction are both parallel to a plane of the base substrate and intersect with each other;

Any second hollow hole and the first hollow holes in the hollow hole row are arranged in a straight line along the first direction, or any second hollow hole and the first hollow holes in the hollow hole column are arranged in a straight line along the second direction.

According to an embodiment of the present disclosure, both the first electrode and the second electrode are transparent electrodes.

According to another aspect of the present disclosure, a liquid crystal display panel is provided, the liquid crystal display panel includes:

An array substrate described above;

A color filter substrate disposed opposite to the array substrate to form a cell;

A liquid crystal layer sandwiched between the array substrate and the color filter substrate.

According to an embodiment of the present disclosure, liquid crystals in the liquid crystal layer are negative liquid crystals It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, and show embodiments in accordance with the disclosure, and together with the specification to explain the principle of the disclosure. Obviously, the drawings in the following description are only some embodiments of the disclosure, for those of ordinary skill in the art, other drawings can be obtained based on these drawings without creative work.

FIG. 2 only shows a first electrode layer, a gate layer, an active layer, and a source and drain metal layer.

FIG. 3 only shows a second electrode layer.

FIG. 4 only shows a first electrode layer, a gate layer, an active layer, a source and drain metal layer and a second electrode layer.

FIG. 13-1 to FIG. 13-4 are schematic structural diagram of the second electrode in an embodiment of the present disclosure.

FIG. 14 is a graph of the light transmittance test result of the liquid crystal display panel having the second electrode shown in FIG. 13-1 to FIG. 13-4 in an embodiment of the present disclosure.

FIG. 15-1 to FIG. 15-10 are the photos of the light transmittance test of different liquid crystal display panels in an embodiment of the present disclosure; the second electrode of each liquid crystal display panel is provided with a circular hollow hole, and the size of each circular hollow hole is different from each other.

FIG. 34-1 to FIG. 34-10 are the photos of the light transmittance test of different liquid crystal display panels in an embodiment of the present disclosure; the second electrode of each liquid crystal display panel is provided with a square hollow hole, and the size of each square hollow hole is different from each other

DETAILED DESCRIPTION

Figure 1:
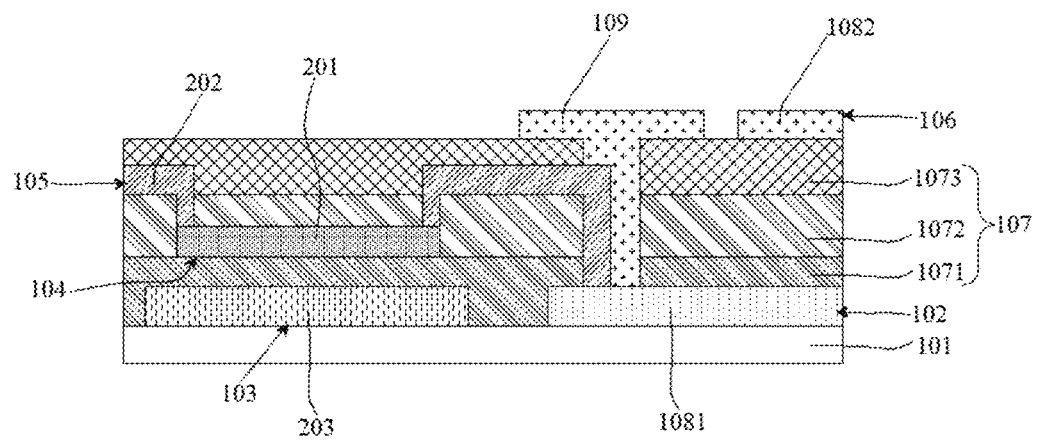
FIG. 1 is a schematic diagram of a cross-sectional structure of an array substrate in an embodiment of the present disclosure.

Exemplary embodiments will now be described more fully with reference to the accompanying drawings. However, the exemplary embodiments can be implemented in various forms, and should not be construed as being limited to the embodiments set forth herein. On the contrary, these embodiments are provided so that this disclosure will be comprehensive and complete, and will fully convey the concept of exemplary embodiments to those skilled in the art. The same reference numerals in the drawings indicate the same or similar structures, and thus their detailed descriptions will be omitted. In addition, the drawings are only schematic illustrations of the present disclosure, and are not necessarily drawn to scale.

Although relative terms such as "upper" and "lower" are used in this specification to describe the relative relationship between one component of an icon and another component, these terms are used in this specification only for convenience, for example, an exemplary direction according to the description in the drawings. It can be understood that if the device of the icon is turned upside down, the components described as "upper" will become the "lower" components. When a structure is "on" other structure(s), it may mean that a certain structure is integrally formed on other structure(s), or that a certain structure is "directly" installed on other structure(s), or that a certain structure is "indirectly" installed on other structure(s) through another structure.

The terms "one", "a" and "the" and "at least one" are used to indicate that there are one or more elements/components/ etc.; the terms "include/comprise" and "have" are used to mean open-ended inclusion and mean that there may be additional elements/components/etc. in addition to the listed elements/components/etc. The terms "first", "second" and "third" are only used as markers and are not a limitation on the number of objects.

In the related art, the ADS liquid crystal display panel may include an array substrate and a color filter substrate that are disposed opposite to each other to form a cell, and a liquid crystal layer sandwiched between the array substrate and the color filter substrate. Where, the array substrate includes a base substrate, a first electrode layer, an insulating dielectric layer, and a second electrode layer that are stacked in sequence. Where, in any pixel area, the first electrode layer may include a first electrode, and the second electrode layer may include a second electrode. Among them, one of the first electrode and the second electrode can be used as a pixel electrode, and the other can be used as a common electrode. A fringe electric field is generated between the pixel electrode and the common electrode, which is used to drive the deflection of the liquid crystal in the liquid crystal layer, thereby controlling the light output of the liquid crystal display panel in the pixel area. In the ADS liquid crystal display panel in the related art, the rotation plane of the liquid crystal molecules is parallel to the plane where the base substrate is located, which leads to a room for further improvement in the contrast of the ADS liquid crystal display panel.

In order to improve the above-mentioned defects of the ADS display panel in the related art, the present disclosure provides a vertically aligned ADS liquid crystal display panel. In the ADS liquid crystal display panel, the liquid crystal molecules adopt a vertical alignment (VA) mode to improve the contrast of the liquid crystal display panel. However, the second electrode of the ADS liquid crystal display panel in the related art is usually a slit electrode, which cannot achieve multi-domain characteristics when applied to the vertically aligned ADS liquid crystal display panel of the present disclosure, which is not conducive to the vertical alignment ADS liquid crystal display panel of the present disclosure to suppress color deviation and improve the viewing angle.

To this end, the present disclosure provides an array substrate, which can be used in a liquid crystal display panel, especially in an ADS liquid crystal display panel, so as to improve the color deviation difference of the liquid crystal display panel under different viewing angles.

Refer to FIG. 1, the array substrate of the present disclosure may include a base substrate 101, a first electrode 1081, an insulating dielectric layer 107, and a second electrode 1082 that are sequentially stacked. Refer to FIGS. 5 to 12, the second electrode 1082 is provided with at least one hollow hole 300, and the hollow hole 300 is in a shape of convex polygon, circle or ellipse.

In the present disclosure, the second electrode 1082 is provided with hollow holes 300, and a fringe electric field can be formed between the edges of the hollow holes 300 and the first electrode 1081. The shape of the hollow hole 300 is a convex polygon, a circle or an ellipse, that is, the edge of the hollow hole 300 is a closed ring and is a convex pattern. The edge of the hollow hole 300 has a closed ring shape, and the fringe electric field between the edge of the hollow hole 300 and the first electrode 1081 changes direction accordingly as the edge direction of the hollow hole 300 changes, which makes the fringe electric field between the edge of the hollow hole 300 and the first electrode 1081 also exhibit characteristics in multiple directions, and can further drive the liquid crystal in the liquid crystal display panel to fall in multiple different directions, so that the liquid crystal display panel exhibits multi-domain characteristics. The hollow hole 300 is a convex pattern, which avoids the hollow hole 300 has a concave pattern partially to reduce the area of the hollow hole 300, and reduces the influence of the phenomenon of phase misalignment in the hollow hole 300 on the light transmittance, thereby ensuring that the hollow hole 300 has a higher light transmittance. In this way, the liquid crystal display panel based on the array substrate of the present disclosure can not only realize multi-domain characteristics, but also ensure high light transmittance.

In the present disclosure, when a polygon is a convex polygon, any edge of the polygon can be used as a support line, and the remaining edges are all on the same side of the support line. Exemplarily, the convex polygon may be a regular polygon, such as a regular quadrilateral, a regular pentagon, a regular hexagon, a regular octagon, and the like. For a circle or an ellipse, it can also be regarded as a convex pattern; Where, any tangent line of the circle or ellipse can be used as a support line, and the remaining points of the circle or the ellipse are all located at the same side of the support line.

Hereinafter, the structure, principle, and effect of the array substrate provided by the present disclosure will be further explained and described in conjunction with the accompanying drawings.

Refer to FIG. 1, the array substrate of the present disclosure includes a base substrate 101, a first electrode layer 102, an insulating dielectric layer 107 and a second electrode layer 106 which are stacked in sequence. where, the first electrode 1081 is located at the first electrode layer 102, and the second electrode 1082 is located at the second electrode layer 106. The first electrode 1081 and the second electrode 1082 are arranged correspondingly; In terms of the correspondingly arranged first electrodes 1081 and second electrodes 1082, the orthographic projection of the first electrode 1081 on the base substrate 101 and the orthographic projection of the second electrode 1082 on the base substrate 101 at least partially overlap. In terms of the shape of the electrode, the first electrode 1081 may be a plate-shaped electrode, and no slit or via hole may be provided. The second electrode 1082 may be provided with hollow holes 300 to form a fringe electric field with the first electrode 1081. In terms of the function of the electrodes, one of the first electrode 1081 and the second electrode 1082 may be a common electrode, and the other may be a pixel electrode. In other words, one of the first electrode layer 102 and the second electrode layer 106 may be provided as a common electrode, and the other may be provided as a pixel electrode.

Figure 2:
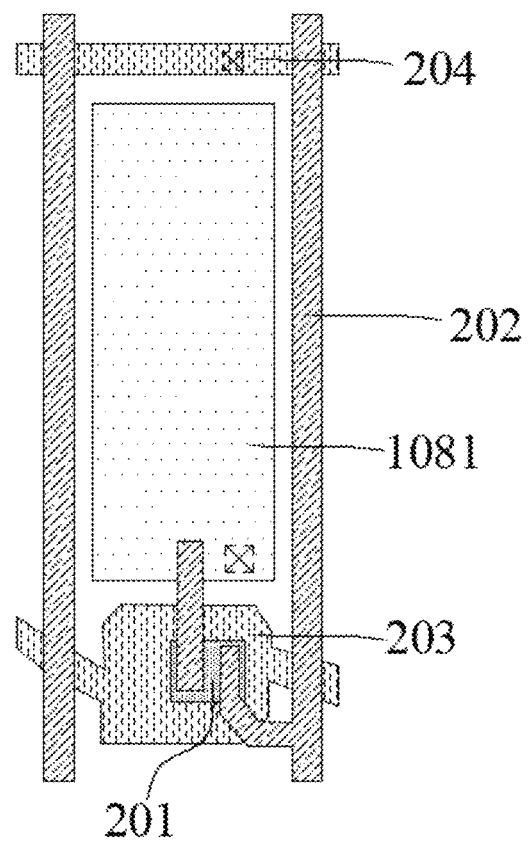
FIG. 2 is a schematic diagram of a top view structure of an array substrate in an embodiment of the present disclosure.
Figure 3:
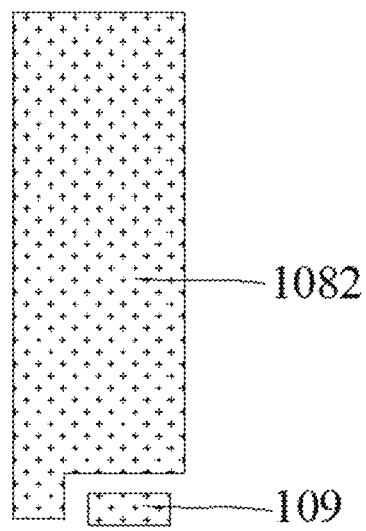
FIG. 3 is a schematic diagram of a top view structure of an array substrate in an embodiment of the present disclosure.
Figure 4:
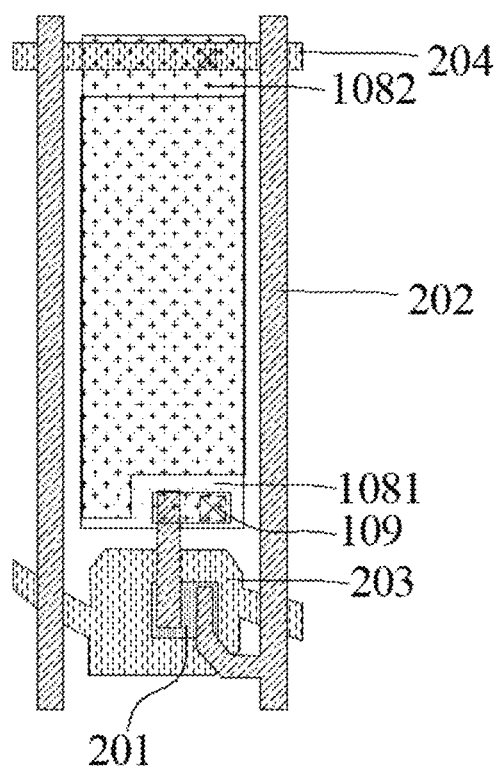
FIG. 4 is a schematic diagram of a top view structure of an array substrate in an embodiment of the present disclosure.

Exemplarily, in an embodiment of the present disclosure, referring to FIGS. 2 to 4, the first electrode 1081 provided at the first electrode layer 102 may be a plate-shaped electrode and may be used as a pixel electrode. The second electrode 1082 provided at the second electrode layer 106 may be provided with hollow holes 300, which may be used as a common electrode.

Optionally, in the array substrate of the present disclosure, the materials of the first electrode layer 102 and the second electrode layer 106 may be a transparent conductive material, for example, the material may be transparent metal oxide. Exemplarily, the material of the second electrode 1082 is ITO (Indium Zinc Oxide).

Refer to FIG. 2, the array substrate of the present disclosure is provided with a plurality of data leads 202, and the data leads 202 can be arranged in parallel with each other. Where, the data leads 202 may extend in the column direction as a whole, and the data lead may be a straight line or a broken line bent back and forth in the row direction.

When the data lead 202 is a broken line, it may include a plurality of lead segments extending in different directions. In some embodiments, the edge of the portion of the data lead 202 close to the second electrode 1082 may be parallel to the edge of the adjacent second electrode 1082.

Exemplarily, in an embodiment of the present disclosure, refer to FIG. 2, the data lead 202 is a straight line and extends along the column direction; Along the row direction, data leads 202 are provided on both sides of the second electrode 1082. The second electrode 1082 is close to the edge of the data lead 202 so as to be parallel to the extending direction of the data lead 202.

Refer to FIGS. 2 and 4, the array substrate of the present disclosure is provided with a plurality of scan leads 203 and switching transistors connected to the pixel electrodes; where, one end of the switching transistor is connected to the data lead 202, the other end of the switching transistor is connected to the pixel electrode, and the gate of the switching transistor is connected to the scan lead 203. Under the control of the scan voltage loaded on the scan lead 203, the switching transistor can be turned on, so that the data voltage of the data lead 202 is loaded to the pixel electrode.

Optionally, refer to FIGS. 2 and 4, the scan leads 203 may extend in the row direction as a whole. The scan lead 203 may be a straight lead along the row direction, or a broken line that is bent back and forth in the column direction. At least part of the first electrode 1081 and the second electrode 1082 may be disposed between two adjacent scan leads 203. In an embodiment of the present disclosure, along the column direction, the first electrode 1081 and the scan lead 203 are alternately arranged, and the second electrode 1082 and the scan lead 203 are alternately arranged.

Optionally, refer to FIG. 2 and FIG. 4, the scan leads 203 may be multiplexed as the gate of the switching transistor. Where, the active layer 201 of the switching transistor may include a source contact region, a channel region, and a drain contact region that are sequentially connected, and the source contact region is connected to the data leads 202 through via holes, the drain contact region and the pixel electrode are connected through a via hole, and the scan lead 203 overlaps the channel region of the switching transistor, so that the portion where the scan lead 203 overlaps with the channel region of the switching transistor can be used as the gate of the switching transistor. Further, refer to FIG. 2 and FIG. 4, the size of the portion where the scan lead 203 overlaps the channel region of the switching transistor can be locally increased, so that the scan lead 203 completely covers the channel region of the switching transistor.

Optionally, the material of the active layer 201 of the switching transistor may be an amorphous silicon semiconductor material, a polysilicon semiconductor material, a metal oxide semiconductor material, or an organic semiconductor material. Exemplarily, in an embodiment of the present disclosure, the material of the active layer 201 of the switching transistor may be a low-temperature polysilicon semiconductor material; where, the source contact region and the drain contact region can be ion-doped to have high conductivity, and the channel region can maintain semiconductor characteristics to be turned on or off in response to the scan signal loaded on the gate.

Optionally, referring to FIG. 2 and FIG. 4, the array substrate of the present disclosure may also be provided with a plurality of common connection lines 204, and the common connection lines 204 extend in the row direction and are connected to the common electrodes arranged in the same line. In other words, the common electrodes arranged in the same row are connected to the same common connection line 204.

Further, the common connection lines 204 and the scan leads 203 can be provided on the same film layer, that is, the materials of the two are the same and they are prepared in the same manufacturing process. So the array substrate may be provided with a gate layer 103, and the gate layer 103 is provided with common connection lines 204 and scan leads 203 alternately arranged. In terms of the correspondingly arranged pixel electrodes and common electrodes, the common electrodes are connected to the common connection lines 204 through via holes, and the gate of the switching transistor connected to the pixel electrode is connected to the scan lead 203.

In some embodiments, the gate layer 103 is located between the base substrate 101 and the insulating dielectric layer 107, and the second electrode 1082 is a common electrode. Each common electrode provided in the same row can be connected to the same common connection line 204 through via holes. Each first electrode 1081 is a pixel electrode; along the column direction, the pixel electrode is sandwiched between a scan lead 203 and a common connection line 204. Where, the scan lead 203 is used to drive the switching transistor electrically connected to the pixel electrode, and the common connection line 204 is used to connect the second electrode 1082 corresponding to the pixel electrode.

In an embodiment of the present disclosure, an alignment layer may not be provided on the side of the second electrode layer away from the base substrate. So the cost increase of the array substrate caused by arranging the alignment layer can be avoided, and the yield reduction caused by the alignment layer can be avoided.

Hereinafter, a film structure of the array substrate and the patterns of each film layer are exemplarily introduced in order to further explain and describe the structure and principle of the array substrate of the present disclosure. It can be understood that the exemplary array substrate is only a specific embodiment of the array substrate of the present disclosure, rather than a specific limitation on the structure of the array substrate of the present disclosure.

Refer to FIG. 1 to FIG. 4, the exemplary array substrate includes a base substrate 101, a first electrode layer 102 and a gate layer 103, a gate insulating layer 1071, a polysilicon semiconductor layer 104, an interlayer dielectric layer 1072, a source and drain metal layer 105, a passivation layer 1073 and a second electrode layer 106 that are stacked in sequence.

In this exemplary array substrate, the base substrate 101 may be a transparent substrate, and its material may be glass, acrylic, or the like.

In this exemplary array substrate, the material of the first electrode layer 102 is transparent metal oxide, such as ITO. The first electrode layer 102 may be formed with first electrodes 1081 distributed in an array. The first electrodes 1081 are plate-shaped electrodes and serve as pixel electrodes. Where, the first electrodes 1081 distributed in an array are arranged into a plurality of first electrodes 1081 rows and a plurality of first electrodes 1081 columns, the first electrode 1081 rows include a plurality of first electrodes 1081 arranged along the row direction, and the first electrodes 1081 columns include a plurality of first electrodes 1081 arranged in the column direction.

In this exemplary array substrate, the gate layer 103 includes a plurality of scan leads 203 and a plurality of common connection lines 204 that extend in the row direction and are alternately arranged. Where, the plurality of scan leads 203 and the plurality of common connection lines 204 are divided into a plurality of lead groups, and one lead group includes a scan lead 203 and a common connection line 204 arranged adjacently. One lead group is arranged corresponding to one first electrode 1081 row; in the correspondingly arranged lead group and one first electrode 1081 row, the scan lead 203 and the common connection line 204 are respectively located on both sides of the first electrode 1081 row. In this way, a scan lead 203 and a common connection line 204 are provided between two adjacent first electrodes 1081 rows. Optionally, the scan lead 203 in the lead group corresponding to the previous first electrode 1081 row and the common connection line 204 in the lead group corresponding to the next first electrode 1081 row are located between two adjacent first electrode 1081 rows.

Where, during the preparation, the first electrode layer 102 may be prepared first and then the gate layer 103 may be prepared, or the gate layer 103 may be prepared first and then the first electrode layer 102 may be prepared. In terms of film layer relationship, the first electrode layer 102 can be located on the side of the gate layer 103 close to the base substrate 101, or on the side of the gate layer 103 far away from the base substrate 101, and can also be nested with the gate layer 103 and sandwiched between the base substrate 101 and the gate insulating layer 1071 together.

In this exemplary array substrate, the polysilicon semiconductor layer 104 is provided on a side of the gate insulating layer 1071 away from the base substrate 101, and it may include a plurality of active layers corresponding to the plurality of first electrodes 1081 one-to-one. The active layer includes a source contact region, a channel region, and a drain contact region that are sequentially connected; the channel region maintains semiconductor characteristics, and the source contact region and the drain contact region are implanted with doped ions to have better conductivity. Among the active layer corresponding to the same first electrode 1081, and the scan lead 203, the orthographic projection of the channel region of the active layer on the base substrate 101 is within the orthographic projection of the scan lead 203 on the base substrate 101. In this way, the source contact region of the active layer can form the source of the switching transistor corresponding to the first electrode 1081, and the drain contact region of the active layer can form the drain of the switching transistor corresponding to the first electrode 1081, the overlapping portion of the scan lead 203 and the channel region can be multiplexed as the gate of the switching transistor corresponding to the first electrode 1081. In an embodiment of the present disclosure, in the active layer and scan lead 203 corresponding to the same first electrode 1081, the source contact region is at least partially located on the side of the scan lead 203 away from the first electrode 1081, and the drain contact region is at least partially located on the side of the scan lead 203 close to the first electrode 1081.

In this exemplary array substrate, the source and drain metal layers 105 are provided on the side of the interlayer dielectric layer 1072 away from the base substrate 101, the source and drain metal layers 105 may include data leads 202 arranged in a one-to-one correspondence with each of the first electrode 1081 columns, and include first connection portions and second connection portions in one-to-one correspondence with each switching transistor. The data lead 202 extends along the column direction and is located at one side of the first electrode 1081 column. A first electrode 1081 column is arranged between two adjacent data leads 202, and a data lead 202 is arranged between two adjacent first electrode 1081 columns. The first connection portion is connected to the data lead 202, and is connected to the source contact region of the corresponding switching transistor through a via hole penetrating the interlayer dielectric layer 1072, The second connection portion is connected to the drain contact region of the corresponding switching transistor through a via hole penetrating the interlayer dielectric layer 1072, and is connected to the first electrode 1081 corresponding to the switching transistor through a via hole penetrating the interlayer dielectric layer 1072 and the gate insulating layer 1071.

In this exemplary array substrate, the second electrode layer 106 is provided on the side of the passivation layer 1073 away from the base substrate 101, and includes second electrodes 1082 provided corresponding to first electrodes 1081 respectively, the second electrode 1082 is provided with hollow holes 300 and functions as a common electrode. One row of second electrodes 1082 corresponds to the same common connection line 204, and one second electrode 1082 overlaps the corresponding common connection line 204, the two are connected by a via hole penetrating the passivation layer 1073, the interlayer dielectric layer 1072, and the gate insulating layer 1071. The second electrode layer 106 is further provided with a via electrode 109, and the via electrode 109 is connected to the second conductive portion of the source and drain metal layer 105 through a via hole penetrating the passivation layer 1073, and is connected to the first electrode 1081 through a via hole penetrating the passivation layer 1073, the interlayer dielectric layer 1072 and the gate insulating layer 1071, thereby connecting the drain of the switching transistor to the first electrode 1081. Correspondingly, refer to FIG. 2 and FIG. 4, in order to provide the via electrode 109, the second electrode 1082 may be formed with an avoiding notch.

In this exemplary array substrate, the passivation layer 1073, the interlayer dielectric layer 1072, and the gate insulating layer 1071 may be made of dielectric materials such as silicon oxide, silicon nitride, and silicon oxynitride. Illustratively, in an embodiment of the present disclosure, the material of the passivation layer 1073 and the interlayer dielectric layer 1072 is silicon nitride, and the material of the gate insulating layer 1071 is silicon oxide. The portion of the passivation layer 1073, the interlayer dielectric layer 1072, and the gate insulating layer 1071 between the first electrode 1081 and the second electrode 1082 may serve as the insulating dielectric layer 107 of the present disclosure. It can be understood that one or more of the passivation layer 1073, the interlayer dielectric layer 1072, and the gate insulating layer 1071, and the portion between the first electrode 1081 and the second electrode 1082 can also be removed or thinned to adjust the thickness of the insulating dielectric layer 107.

In the array substrate provided by the present disclosure, refer to FIG. 5 to FIG. 12, the second electrode 1082 is provided with at least one hollow hole 300, the hollow hole 300 is a convex polygon, a circle or an ellipse. The number of the hollow holes 300 can be determined according to the size of the second electrode 1082. The smaller the size of the hollow hole 300, the more the number of hollow hole 300; the larger the size of the second electrode 1082, the larger the number of hollow hole 300. It is understandable that the distance between the hollow holes 300 is also an important factor affecting the number of the hollow hole 300. The larger the distance between the hollow holes 300, the smaller the number of the hollow hole 300.

Optionally, the hollow holes 300 are distributed all over the second electrode 1082, so that the hollow area of the second electrode 1082 can be increased as much as possible, thereby further improving the light transmittance of the display panel. It can be understood that there is no direct connection between the hollow holes 300 and between the hollow holes 300 and the edge of the second electrode 1082, so as to avoid the hollow holes 300 from separating the second electrode 1082 and to avoid affecting the formation and distribution of the fringe electric field.

In order to verify the influence of different hollow holes on the light transmittance of the liquid crystal display panel, the present disclosure prepared and tested the first to fourth test liquid crystal display panels. FIG. 13-1 is a partial structural diagram of the second electrode 1082 of the first test liquid crystal display panel, in which the black filled part represents the hollow holes. The hollow hole 300 on the second electrode 1082 is in a shape of circle, and the hollow holes 300 are distributed in an array. FIG. 13-4 is a partial structural diagram of the second electrode 1082 of the fourth test liquid crystal display panel, in which the black filled part represents the hollow holes. The hollow hole 300 on the second electrode 1082 is in a shape of square, and the hollow holes 300 are distributed in an array along the row and column direction; where, the row direction may be the direction from the upper left corner to the lower right corner of FIG. 13-4, and the column direction may be the direction from the lower left corner to the upper right corner of FIG. 13-4. FIG. 13-2 is a partial structural diagram of the second electrode 1082 of the second test liquid crystal display panel, in which the black filled part represents the hollow holes. The hollow hole 300 on the second electrode 1082 is in a shape of square, and the hollow holes 300 are distributed in an array along the row and column direction; where, the row direction may be the direction from the upper left corner to the lower right corner of FIG. 13-2, and the column direction may be the direction from the lower left corner to the upper right corner of FIG. 13-2. The hollow holes 300 of two adjacent rows are staggered, and the hollow holes 300 of two adjacent columns of are staggered. The arrangement of the hollow holes of the second test liquid crystal display panel can be understood as on the basis of the second electrode 1082 of the fourth test liquid crystal display panel, in each row of hollow holes 300, every other hollow hole 300, a hollow hole 300 is eliminated, and in each column of hollows holes 300, every other hollow hole 300, a hollow hole 300 is eliminated, which makes the number of hollow holes 300 on the second electrode 1082 in the second test liquid crystal display panel nearly halved. FIG. 13-3 is a partial structural diagram of the second electrode 1082 of the third test liquid crystal display panel, in which the black filled part represents the hollow holes. The hollow hole 300 on the second electrode 1082 is in a shape of cross, and the hollow holes 300 are distributed in an array.

FIG. 14 shows the light transmittance of the first to fourth test liquid crystal display panels. Among them, the curve represented by "circle" is the light transmittance of the first test liquid crystal display panel, and the curve represented by "square hollow" is the light transmittance of the fourth test liquid crystal display panel. The curve represented by the "square interval" is the light transmittance of the second test liquid crystal display panel, and the curve represented by the "cross shape" is the light transmittance of the third test liquid crystal display panel. Refer to FIG. 14, the light transmittance of the first test liquid crystal display panel and the light transmittance of the fourth test liquid crystal display panel are significantly higher than the light transmittance of the second test liquid crystal display panel and the light transmittance of the third test liquid crystal display panel.

Comparing the light transmittance of the second test liquid crystal display panel and the light transmittance of the fourth test liquid crystal display panel shows that, in the case where nearly half of the hollow holes 300 are eliminated on the second electrode 1082 in the second test liquid crystal display panel, its light transmittance is still basically the same as that of the third test liquid crystal display panel, which shows that compared to the cross-shaped hollow hole 300 as a concave polygon, the hollow hole 300 as a convex polygon can significantly improve the light transmittance of the liquid crystal display panel.

Comparing the light transmittance of the second test liquid crystal display panel and the light transmittance of the fourth test liquid crystal display panel, it can be seen that the elimination of nearly half of the hollow holes 300 on the second electrode 1082 in the test liquid crystal display panel will result in a significant decrease in the light transmittance of the test liquid crystal display panel, which indicates that increasing the number of hollow holes 300 on the second electrode 1082 helps to increase the light transmittance of the liquid crystal display panel.

Comparing the light transmittance of the first test liquid crystal display panel and the light transmittance of the fourth test liquid crystal display panel, it can be seen that when the second electrode 1082 is covered with hollow holes 300, no matter whether the shape of the hollow hole 300 is square or circle, the liquid crystal display panel can have a higher light transmittance, which shows that the shape of the hollow hole 300 is a convex pattern, such as a regular polygon, a circle, an ellipse, etc., which can ensure that the liquid crystal display panel has a high light transmittance.

Optionally, in the array substrate of the present disclosure, refer to FIG. 5 to FIG. 12, the hollow holes 300 may include first hollow holes 301, and each of the first hollow holes 301 may be distributed in an array. Where, the first hollow holes 301 are arranged into at least one hollow hole row A, and the hollow hole row A includes a plurality of first hollow holes 301 successively adjacent and arranged linearly along the first direction C. In other words, on the second electrode 1082, one or more hollow hole rows A may be provided, and any one of the hollow hole rows A includes a plurality of first hollow holes 301 successively adjacent and arranged along the first direction C. It is understandable that, in some embodiments, a hollow hole row A may also include only one first hollow hole 301. That is, one hollow hole row A may include one first hollow hole 301 or may include a plurality of first hollow holes 301.

In an embodiment of the present disclosure, the distance between two adjacent first hollow holes 301 is in the range of 2 μm to 4 μm.

In an embodiment of the present disclosure, the distance between any two adjacent first hollow holes 301 is the same.

In the present disclosure, the distance between two hollow holes 300 refers to the minimum distance between any point on the edge of one hollow hole 300 and any point on the edge of the other hollow hole 300.

Optionally, the first hollow holes 301 may also be arranged into at least one hollow hole column B, and the hollow hole column B includes a plurality of first hollow holes 301 that are successively adjacent and arranged linearly along the second direction D; the second direction D is parallel to the plane of the base substrate 101 and intersects the first direction C. It is understandable that, in some embodiments, one hollow hole column B includes one first hollow hole 301. That is, one hollow hole row B may include one first hollow hole 301 or may include a plurality of first hollow holes 301.

Optionally, the included angle between the first direction C and the second direction D is 90° or 60°. In this way, the distribution density of the first hollow holes 301 can be increased, thereby increasing the number of the first hollow holes 301 on the second electrode 1082, and improving the light transmittance of the liquid crystal display panel.

Exemplarily, refer to FIG. 5, FIG. 6, FIG. 9, and FIG. 10, the included angle between the first direction C and the second direction D is 90°. In this way, there are four first hollow holes 301 in two adjacent hollow hole rows A and two adjacent hollow hole columns B, and the four first hollow holes 301 may be distributed in a square shape, the centers of the four first hollow holes 301 are respectively located on the four vertexes of a square.

Exemplarily, refer to FIG. 7, FIG. 8, FIG. 11, and FIG. 12, the included angle between the first direction C and the second direction D is 60°. In this way, there are three first hollow holes 301 in two adjacent hollow hole rows A and two adjacent hollow hole columns B, and the three first hollow holes 301 may be distributed in an equilateral triangle. The centers (O1, O2, and O3) of the three first hollow holes 301 are respectively located on the three vertexes of a triangle. In this embodiment, the first hollow holes 301 are closely arranged in a regular hexagon.

In some embodiments, the hollow hole 300 is in a shape of a square; the included angle between one edge of the hollow hole 300 and the first direction C is in the range of 0-10°.

Optionally, refer to FIG. 7, FIG. 8, FIG. 11, and FIG. 12, the hollow holes 300 further include second hollow hole(s) 302, and the second hollow holes 302 are disposed close to the outer edge of the second electrode 1082; the distance (d2, d3) between the second hollow hole 302 and the adjacent first hollow hole 301 is smaller than the distance d1 between the two adjacent first hollow holes 301.

Further, the first hollow holes 301 are arranged into at least one hollow hole row A and at least one hollow hole column B; the hollow hole row A includes a plurality of first hollow holes 301 that are successively adjacent and arranged linearly along the first direction C; the hollow hole column B includes a plurality of first hollow holes 301 that are successively adjacent and arranged linearly along the second direction D; the first direction C and the second direction D are both parallel to the plane of the base substrate 101 and intersect with each other.

Any second hollow holes 302 and the first hollow holes 301 in the hollow hole row A are arranged in a straight line along the first direction C, or and the first hollow holes 301 in the hollow hole column B are arranged in a straight line along the second direction D.

In some embodiments, the first hollow holes 301 are distributed in an array, and are arranged into a hollow hole row A and a hollow hole column B. Where, the distance between the centers of two adjacent first hollow holes 301 is a preset distance. When the space between a hollow hole row A and the edge of the second electrode is enough to provide a hollow hole, but not enough to keep the hollow hole and the adjacent first hollow hole 301 in the hollow hole row A at a preset distance, a second hollow hole 302 can be provided in the space. Although the first hollow holes and the second hollow holes cannot maintain the overall array distribution, this arrangement can increase the number of hollow holes on the second electrode, thereby increasing the light transmittance of the liquid crystal display panel.

Correspondingly, when the space between a hollow hole column B and the edge of the second electrode is enough to provide a hollow hole, but not enough to keep the hollow hole and the adjacent first hollow hole 301 in the hollow hole column B at a preset distance, a second hollow hole 302 can be provided in the space. Although the first hollow holes and the second hollow holes cannot maintain the overall array distribution, this arrangement can increase the number of hollow holes on the second electrode, thereby increasing the light transmittance of the liquid crystal display panel.

In the present disclosure, it is possible to prepare a liquid crystal display panel in which the second electrode 1082 has only one circular hollow hole 300, and test the light transmittance changes of the liquid crystal display panel at different positions on a test reference line.

Figure 5:
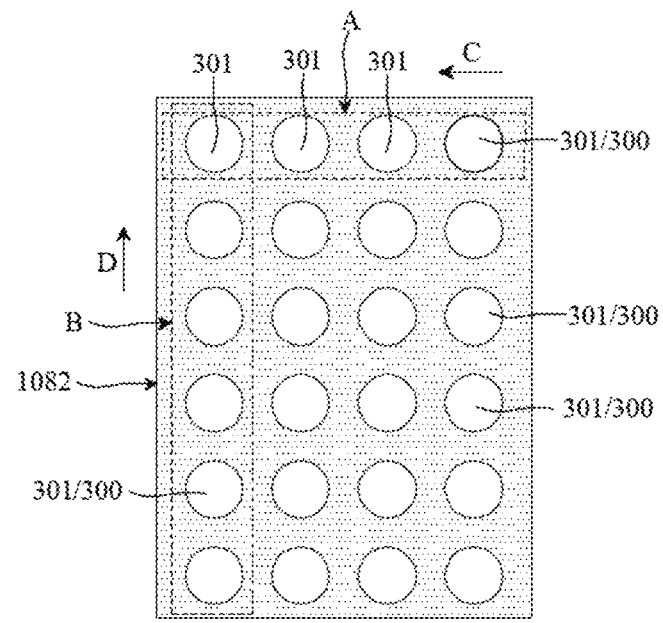
FIG. 5 is schematic structural diagram of a second electrode in an embodiment of the present disclosure.
Figure 6:
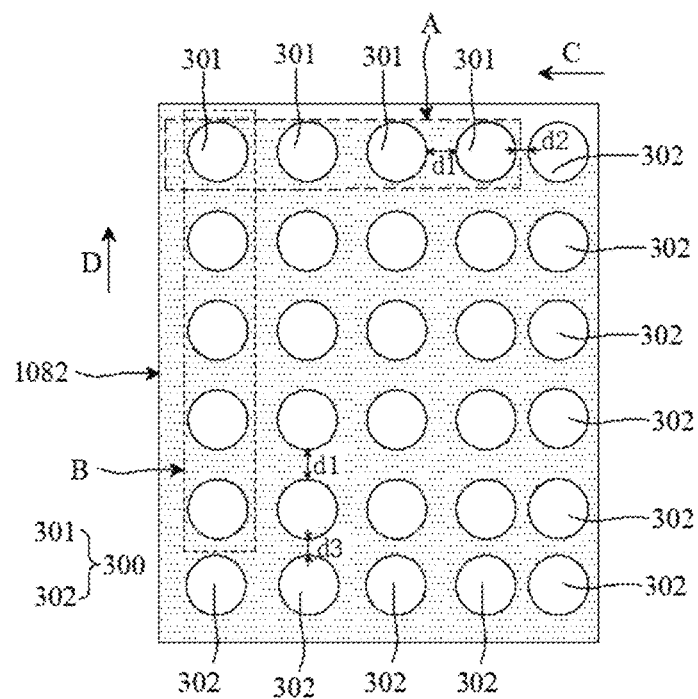
FIG. 6 is schematic structural diagram of the second electrode in an embodiment of the present disclosure.
Figure 7:
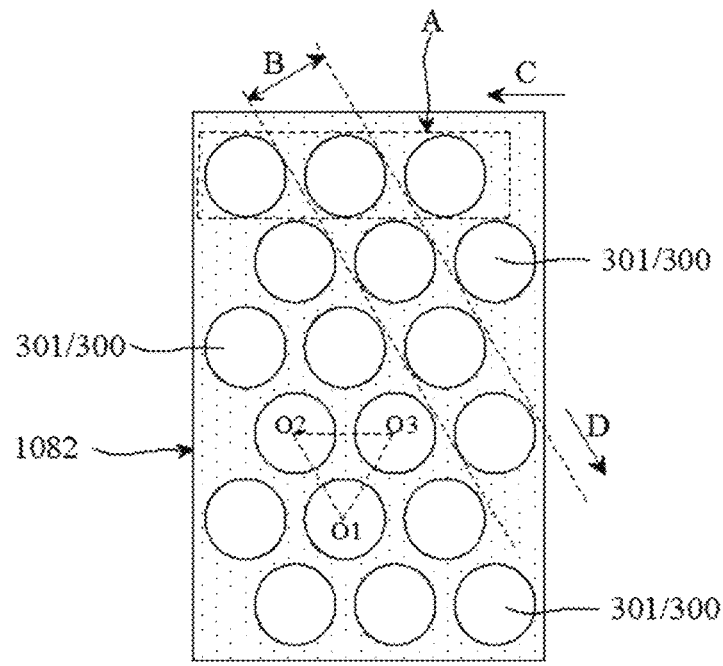
FIG. 7 is schematic structural diagram of the second electrode in an embodiment of the present disclosure.
Figure 8:
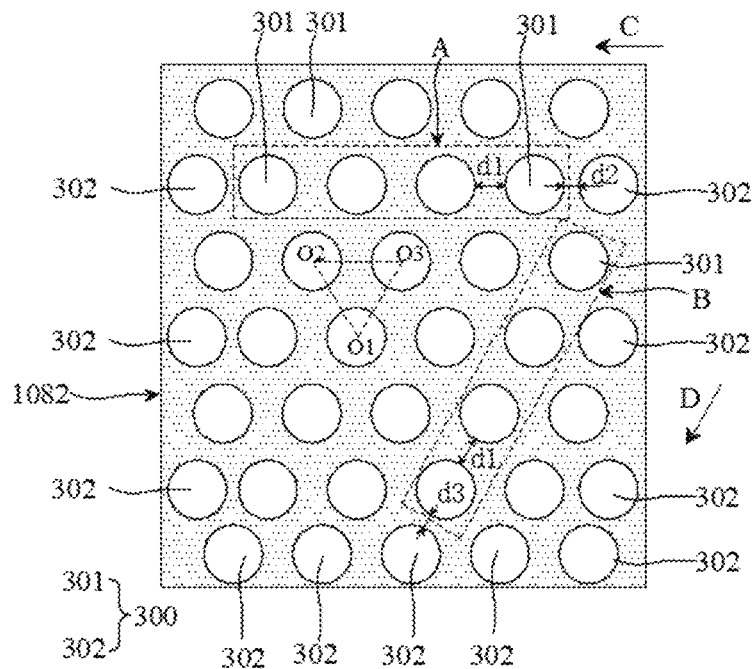
FIG. 8 is schematic structural diagram of the second electrode in an embodiment of the present disclosure.
Figure 9:
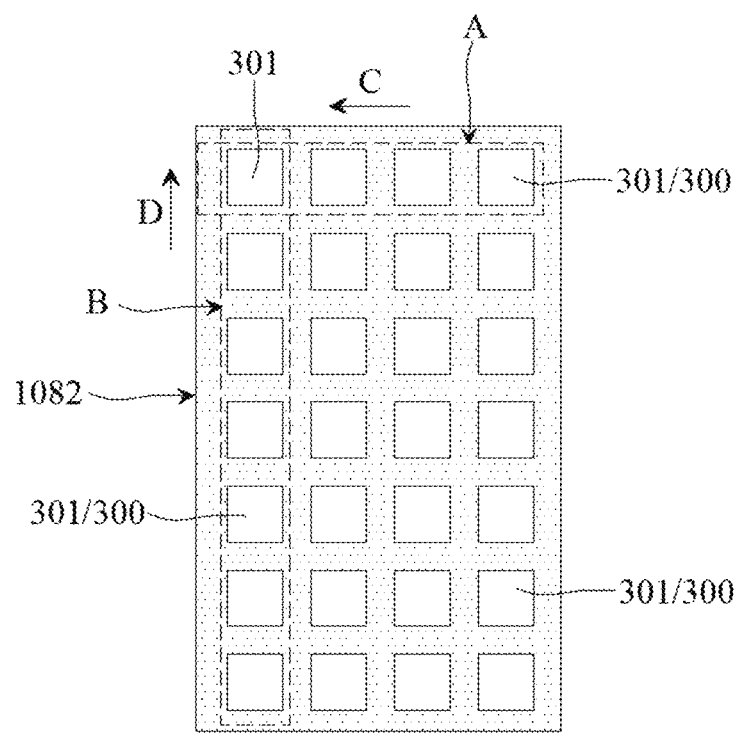
FIG. 9 is schematic structural diagram of the second electrode in an embodiment of the present disclosure.
Figure 10:
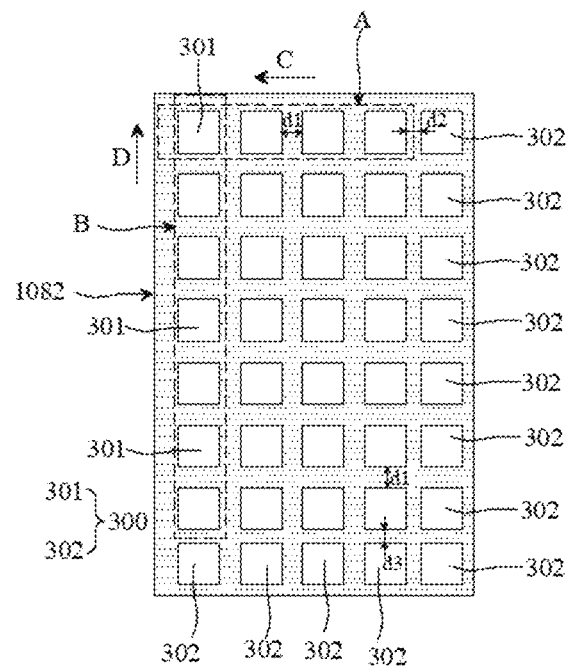
FIG. 10 is schematic structural diagram of the second electrode in an embodiment of the present disclosure.
Figure 11:
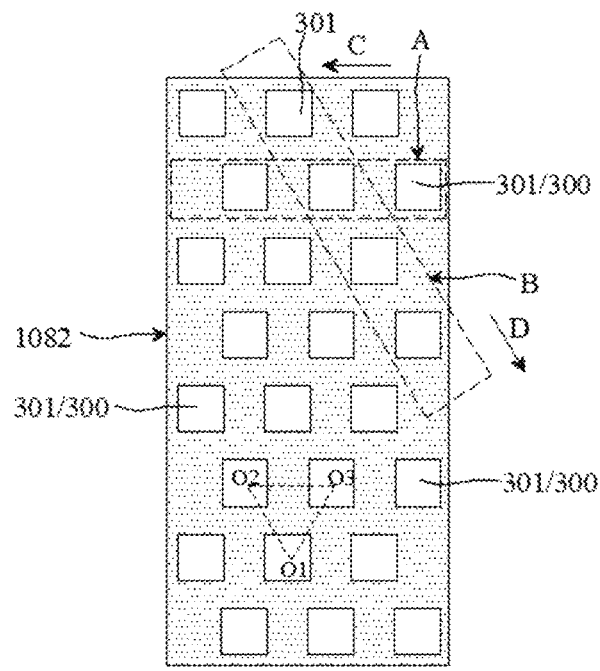
FIG. 11 is schematic structural diagram of the second electrode in an embodiment of the present disclosure.
Figure 12:
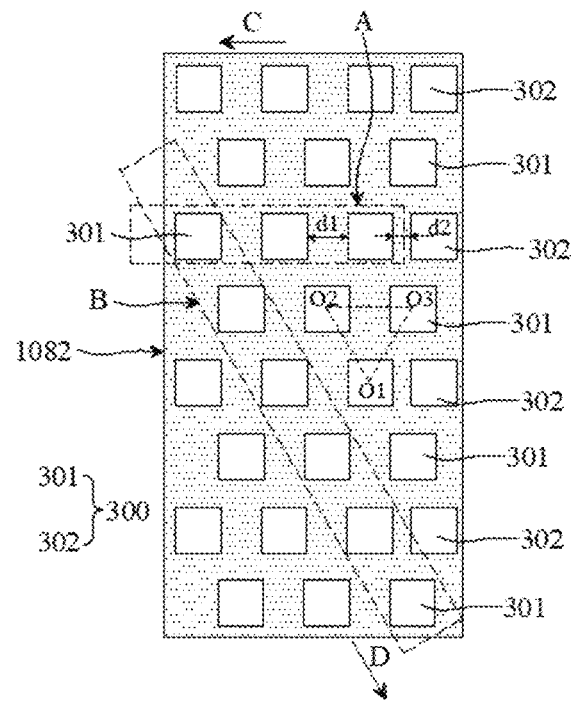
FIG. 12 is schematic structural diagram of the second electrode in an embodiment of the present disclosure.

FIG. 15-1 to FIG. 15-10 respectively show the test photos when the hollow holes 300 have different sizes. Among them, FIG. 15-1 is a photo of the test when the diameter of the hollow hole is 2 μm; FIG. 15-2 is a photo of the test when the diameter of the hollow hole is 4 μm; FIG. 15-3 is a photo of the test when the diameter of the hollow hole is 6 μm; FIG. 15-4 is a photo of the test when the diameter of the hollow hole is 8 μm; FIG. 15-5 is a photo of the test when the diameter of the hollow hole is 10 μm; FIG. 15-6 is a photo of the test when the diameter of the hollow hole is 12 μm; FIG. 15-7 is a photo of the test when the diameter of the hollow hole is 14 μm; FIG. 15-8 is a photo of the test when the diameter of the hollow hole is 16 μm; FIG. 15-9 is a photo of the test when the diameter of the hollow hole is 18 μm; FIG. 15-10 is a photo of the test when the diameter of the hollow hole is 20 μm. According to these photos, when the diameter of the hollow hole is different, the light transmittance of the liquid crystal display panel is different. Refer to FIG. 15-3~FIG. 15-10, the liquid crystal display panel exhibits obvious four-domain characteristics, and there is a phenomenon of phase misalignment between the four domain regions.

Figure 16:
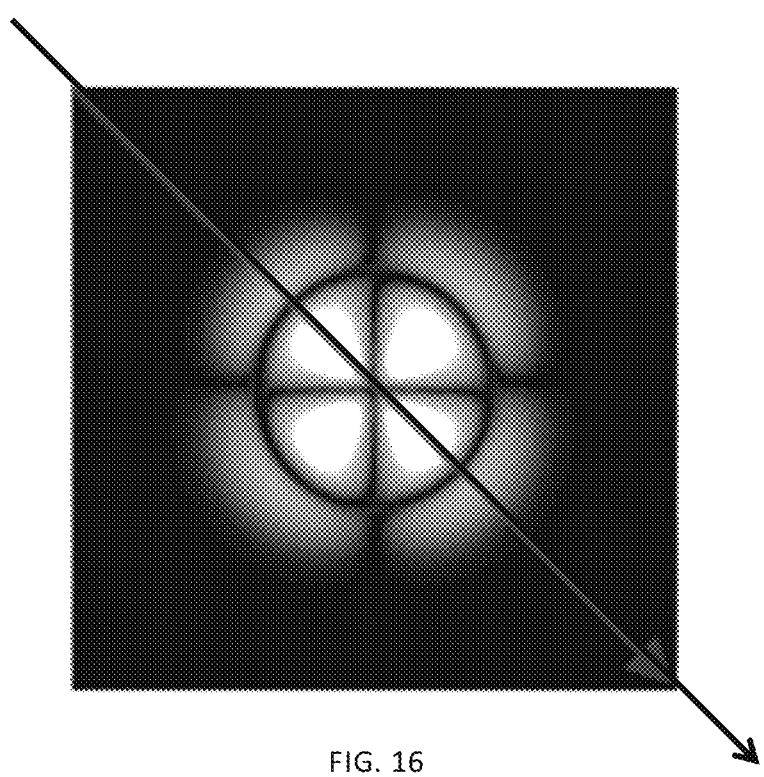
FIG. 16 is a schematic diagram of the light transmittance data collection position in the light transmittance test of the liquid crystal display panel in an embodiment of the present disclosure.
Figure 17:
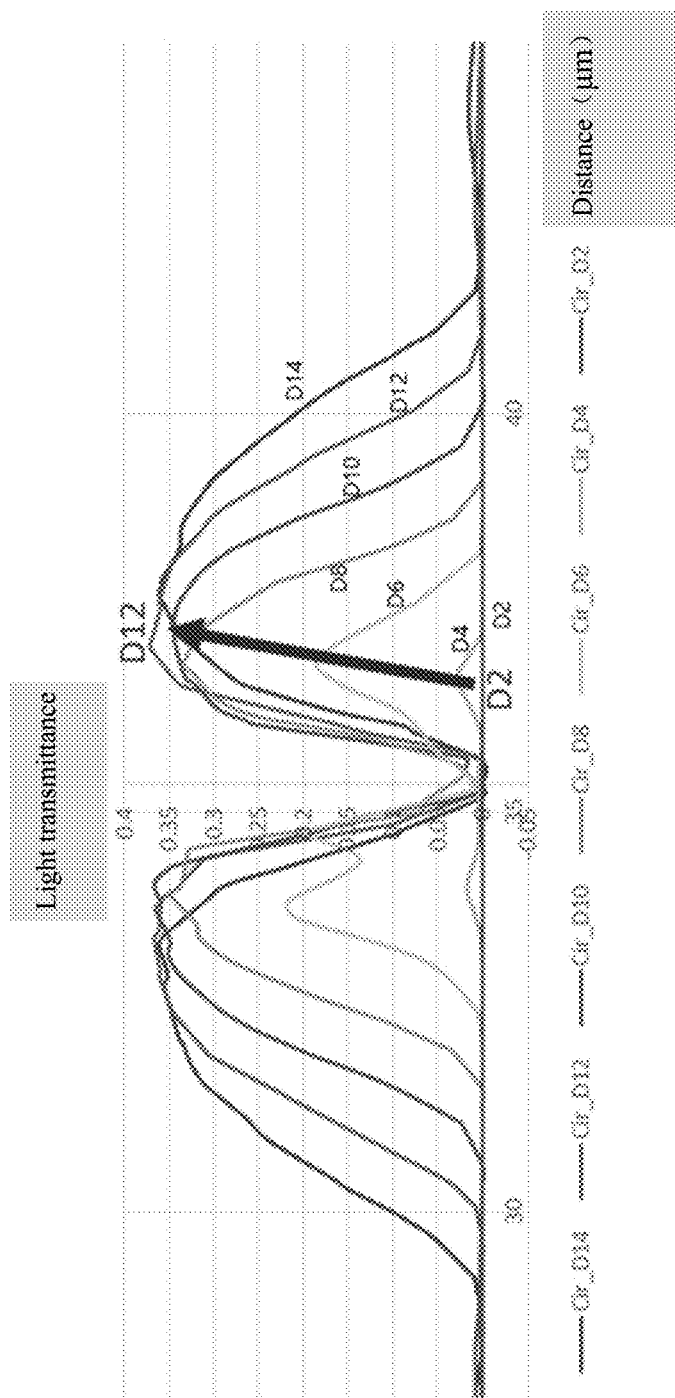
FIG. 17 is a graph of the light transmittance test results of different liquid crystal display panels in an embodiment of the present disclosure.
Figure 18:
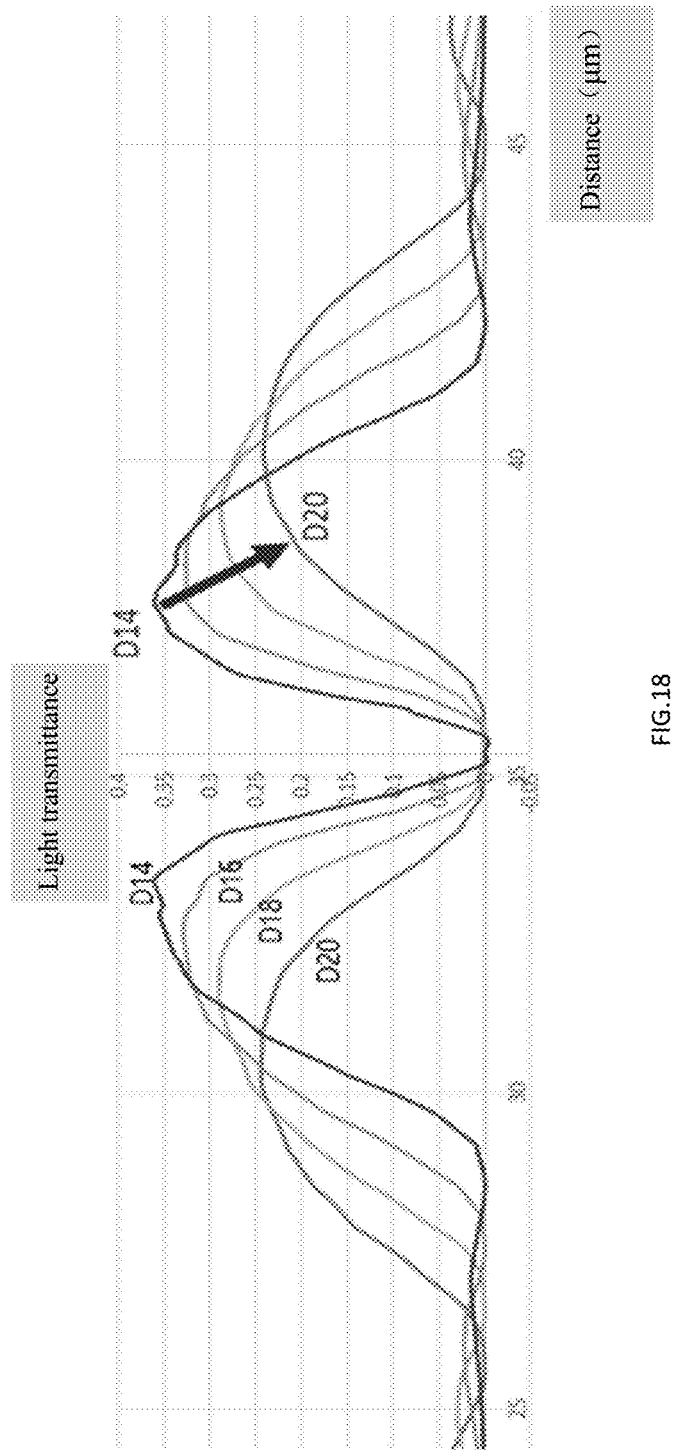
FIG. 18 is a graph of the light transmittance test results of different liquid crystal display panels in an embodiment of the present disclosure.

FIG. 16 shows the location of the test reference line, as indicated by the arrow. FIG. 17 shows the change of light transmittance at different positions of the hollow hole when the size of the hollow hole is in the range of 2 μm to 14 μm; FIG. 18 shows the change of light transmittance at different positions of the hollow hole when the size of the hollow hole is in the range of 14 μm to 20 μm; In FIG. 17 and FIG. 18, the abscissa distance is the relative distance, which is used to indicate the relative distance between different test positions and the test reference origin; Dx represents the test curve of a hollow hole with a diameter of x micrometers.

According to FIG. 17 and FIG. 18, the maximum light transmittance of the hollow hole 300 increases first and then gradually decreases as the diameter of the circular hollow hole 300 increases. When the diameter of the circular hollow hole 300 is not greater than 12 μm, the maximum light transmittance of the hollow hole 300 increases as the diameter of the circular hollow hole 300 increases; when the diameter of the circular hollow hole 300 is not less than 14 μm, the maximum light transmittance in the hollow hole 300 decreases as the diameter of the circular hollow hole 300 increases. When the diameter of the circular hollow hole 300 is between 10 μm and 14 μm, the maximum light transmittance of the hollow hole 300 exceeds 35%.

Figure 19:
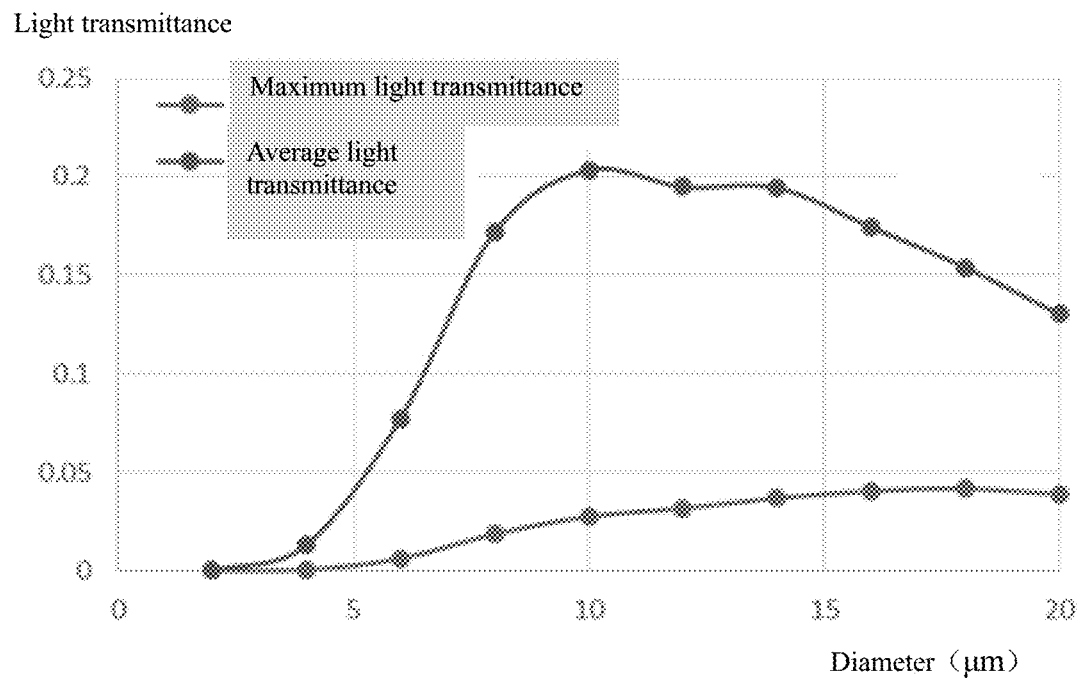
FIG. 19 is a graph of the light transmittance test results of different liquid crystal display panels in an embodiment of the present disclosure.

FIG. 19 shows the average light transmittance of the hollow holes 300 when the hollow holes 300 have different sizes, and the average light transmittance of the liquid crystal display panel when the hollow holes 300 have different sizes. Refer to FIG. 19, when the diameter of the circular hollow hole 300 is 10 μm, the maximum light transmittance of the liquid crystal display panel at the hollow hole 300 reaches the maximum value; and when the diameter of the circular hollow hole 300 is 12 μm or 14 μm, the average light transmittance of the liquid crystal display panel at the hollow hole 300 is close to 20%, which is maintained at a relatively high level. When the diameter of the circular hollow hole 300 reaches more than 10 μm, the growth rate of the overall light transmittance of the liquid crystal display panel decreases as the diameter of the circular hollow hole 300 increases.

Based on the above test of the liquid crystal display panel provided with a single circular hollow hole 300, it can be seen that when the diameter of the circular hollow hole 300 is in the range of 10 μm to 14 μm, the liquid crystal display panel can obtain a larger light transmittance in the region provided with the hollow hole 300.

In an embodiment of the present disclosure, the shape of the hollow hole 300 is circle, and the diameter of the hollow hole 300 is in the range of 11 μm to 13 μm.

Figure 20:
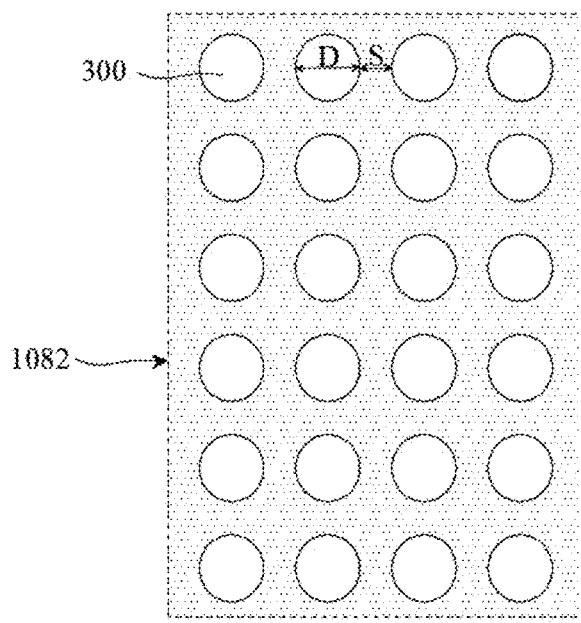
FIG. 20 is a schematic structural diagram of the second electrode of the liquid crystal display panel used for light transmittance test in an embodiment of the present disclosure.

In the present disclosure, a liquid crystal display panel in which the second electrode 1082 has an array of hollow holes 300 can be prepared. Refer to FIG. 20, the shape of the hollow holes 300 is circle, and the included angle between the hollow hole row A and the hollow hole column B is 90°. That is, in the liquid crystal display panel, the hollow holes 300 may be densely distributed in a square shape. The liquid crystal display panel used for testing may not be provided with an alignment layer, and the included angle between the upper and lower polarizers of the liquid crystal display panel is 90°.

Figure 25:
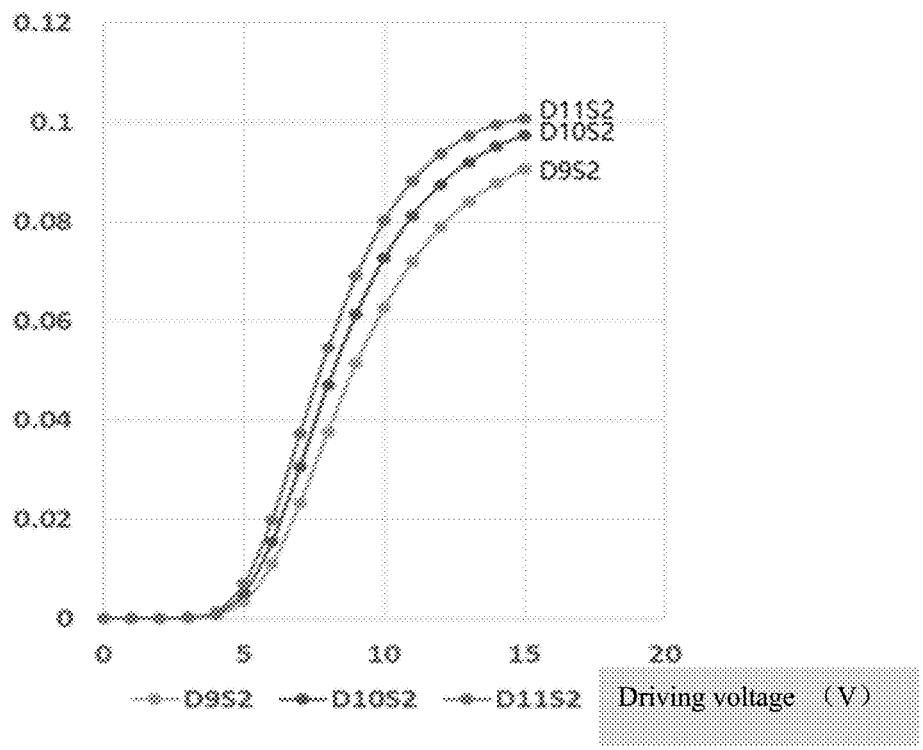
FIG. 25 is a graph of the light transmittance test results of different liquid crystal display panels in an embodiment of the present disclosure.
Figure 26:
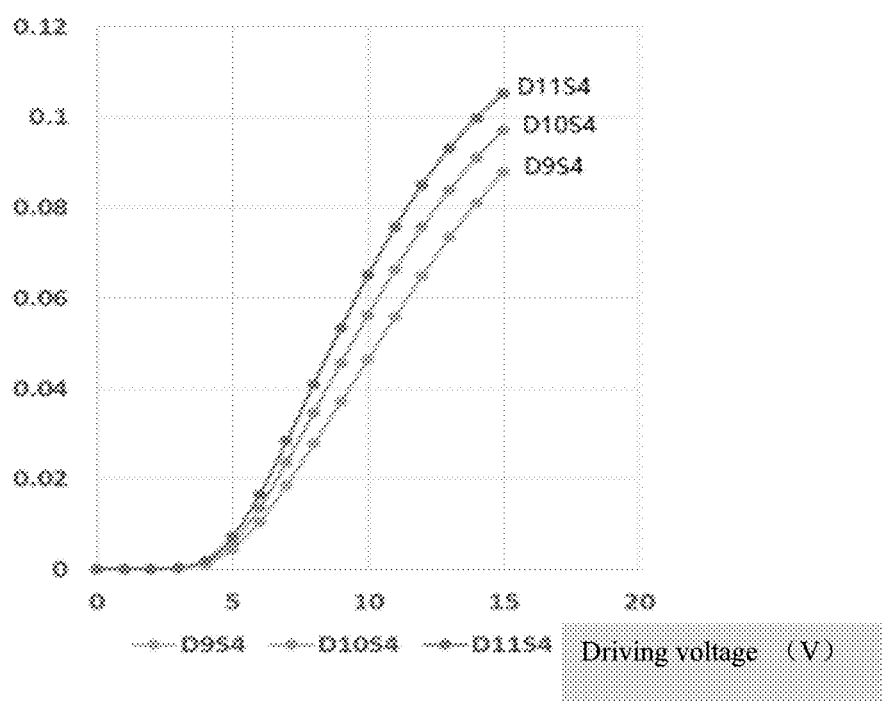
FIG. 26 is a graph of the light transmittance test results of different liquid crystal display panels in an embodiment of the present disclosure.
Figure 27:
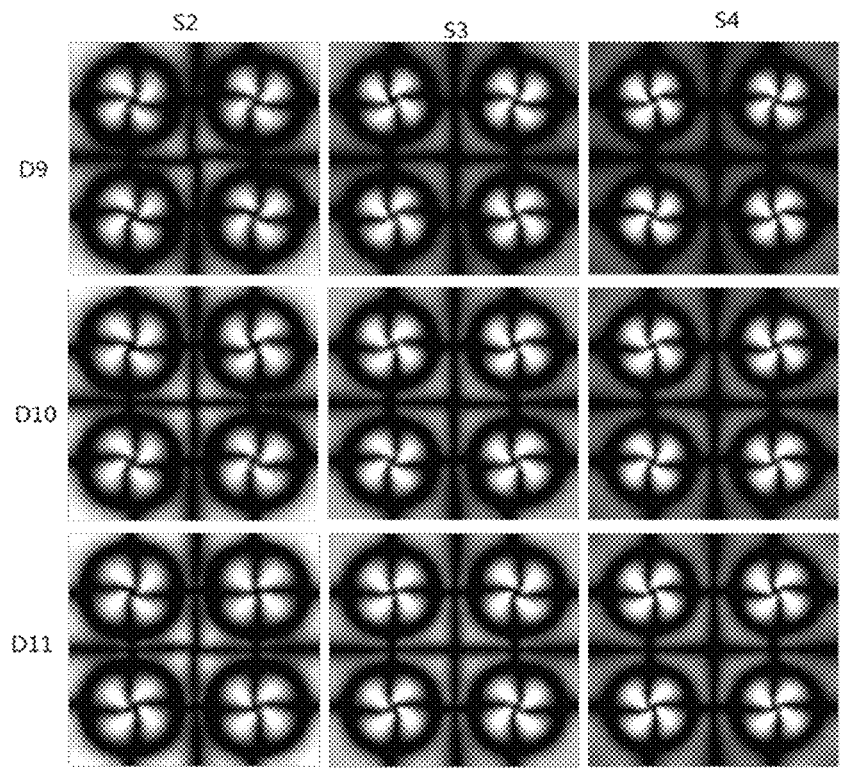
FIG. 27 is a photo of the light transmittance test of different liquid crystal display panels in an embodiment of the present disclosure.

The present disclosure also tests the light transmittance of the liquid crystal display panels under different driving voltages when the liquid crystal display panels have different second electrodes 1082. In FIG. 21 to FIG. 26, DxSy indicates that the diameter D of the hollow holes is x μm and the spacing S is y μm. FIG. 27 shows test photos of liquid crystal display panels with different second electrodes. The photo at the intersection of the Dx row and the Sy column is a test photo of a liquid crystal display panel with a hollow hole diameter of x μm and a hollow hole pitch of y μm.

Figure 21:
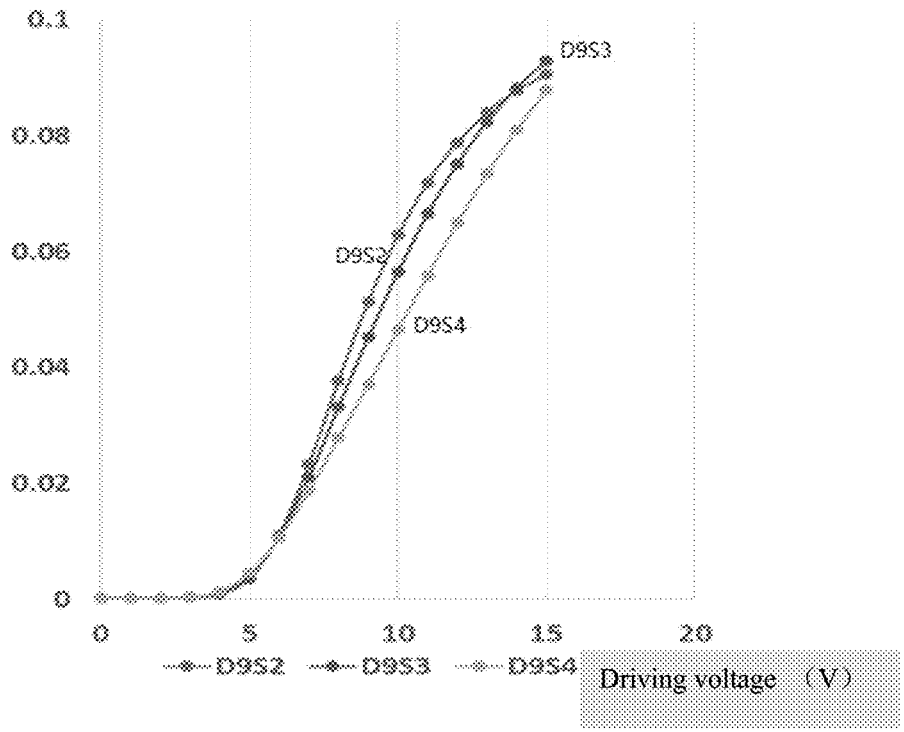
FIG. 21 is a graph of the light transmittance test results of different liquid crystal display panels in an embodiment of the present disclosure.
Figure 22:
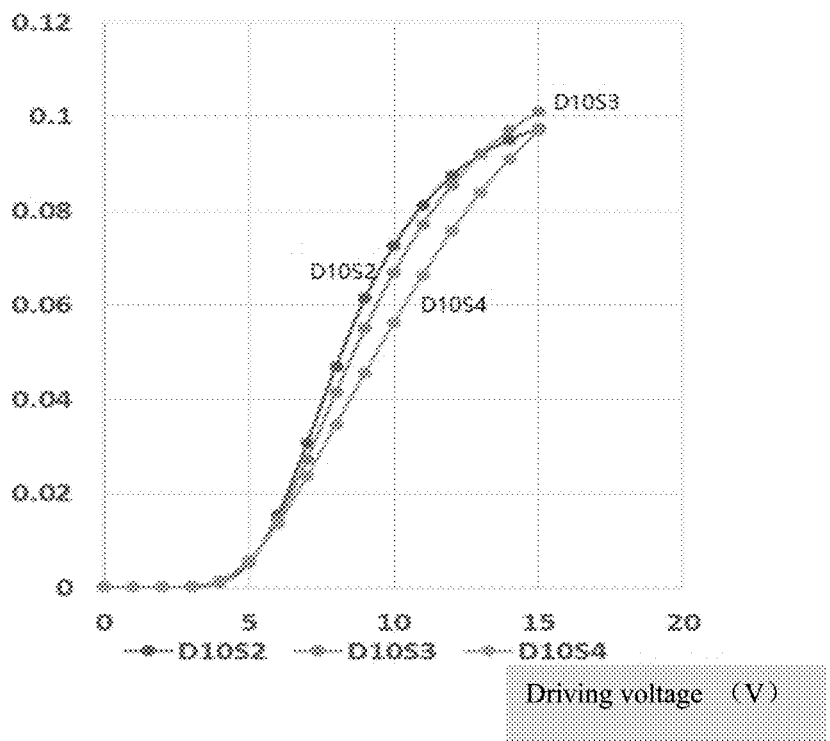
FIG. 22 is a graph of the light transmittance test results of different liquid crystal display panels in an embodiment of the present disclosure.
Figure 23:
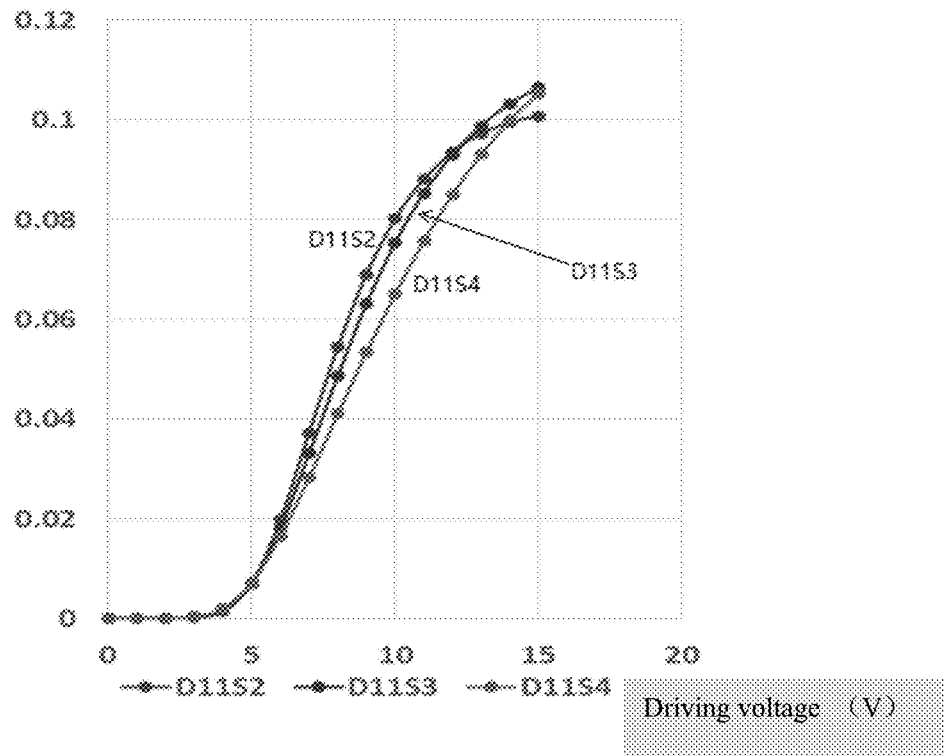
FIG. 23 is a graph of the light transmittance test results of different liquid crystal display panels in an embodiment of the present disclosure.
Figure 24:
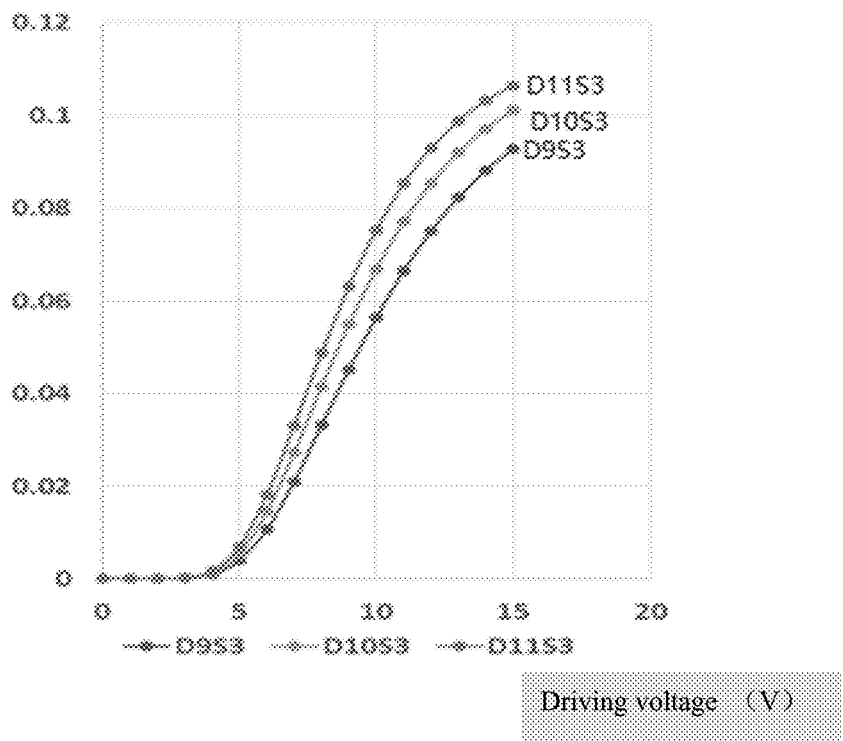
FIG. 24 is a graph of the light transmittance test results of different liquid crystal display panels in an embodiment of the present disclosure.

Refer to FIG. 21 to FIG. 23, in each liquid crystal display panel, when the diameter of the hollow holes 300 is fixed, the liquid crystal display panel with a spacing between the hollow holes 300 of 2 μm has the lowest starting voltage Vth, where, the starting voltage Vth is a voltage loaded on the first electrode 1081 and the second electrode 1082 to cause the liquid crystal to start to fall. When the voltage difference loaded on the first electrode 1081 and the second electrode 1082 is 9V, the liquid crystal display panel with the spacing between the hollow holes 300 of 2 μm has the highest light transmittance. When the voltage difference loaded on the first electrode 1081 and the second electrode 1082 is 15V, the liquid crystal display panel with the spacing between the hollow holes 300 of 3 μm has the highest light transmittance. Refer to FIG. 24 to FIG. 26, when the spacing between the hollow holes 300 is fixed, the larger the diameter of the hollow hole 300, the greater the light transmittance of the liquid crystal display panel. Refer to FIG. 27, when the hollow holes are arranged in an array, the positions of the hollow holes all exhibit obvious four-domain characteristics.

In some embodiments of the present disclosure, each of the hollow holes 300 is in a shape of circle, and the first hollow holes are densely distributed in a square. The diameter of each of the hollow holes 300 is in a range of 11 μm to 13 μm, and the distance between the first hollow holes is 2 μm to 4 μm.

Exemplarily, in an embodiment of the present disclosure, the diameter of the hollow hole 300 is 11 μm, and the distance between the centers of two adjacent first hollow holes 301 is 14 μm.

Figure 28:
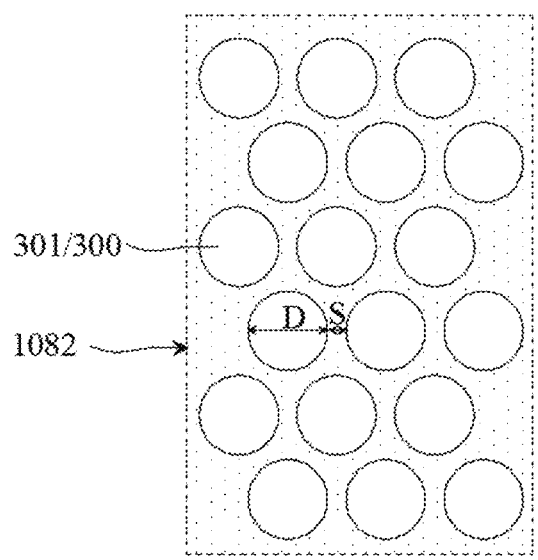
FIG. 28 is a schematic structural diagram of the second electrode of the liquid crystal display panel used for light transmittance test in an embodiment of the present disclosure.

In the present disclosure, a liquid crystal display panel in which the second electrode 1082 has an array of hollow holes 300 can be prepared. Refer to FIG. 28, the shape of each of the hollow holes 300 is square, and the included angle between the hollow hole row A and the hollow hole column B is 60°. That is, in the liquid crystal display panel, the hollow holes 300 may be densely distributed in a regular hexagon. The liquid crystal display panel used for testing may not be provided with an alignment layer, and the included angle between the upper and lower polarizers of the liquid crystal display panel is 90°.

Figure 29:
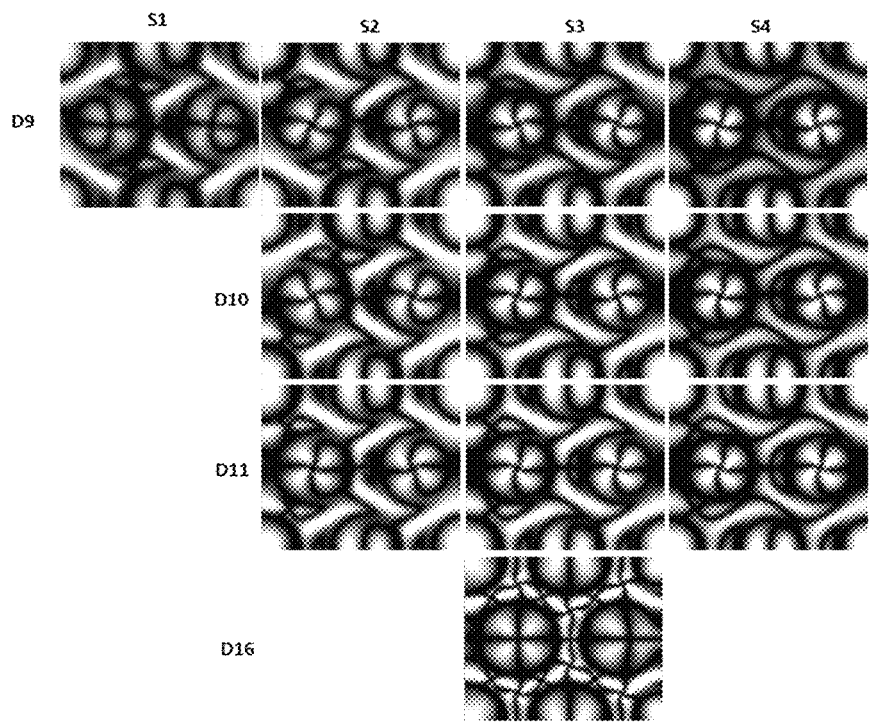
FIG. 29 is a photo of the light transmittance test of different liquid crystal display panels in an embodiment of the present disclosure.

The present disclosure also tests the light transmittance of the liquid crystal display panel under different driving voltages when the liquid crystal display panel has different second electrodes 1082, and the results are shown in FIG. 30 to FIG. 33. Where, in FIG. 30 to FIG. 33, DxSy indicates that the diameter D of the hollow holes is x μm and the spacing S is y μm. FIG. 29 shows test photos of liquid crystal display panels with different second electrodes. The photo at the intersection of the Dx row and the Sy column is a photo shows a liquid crystal display panel with a hollow hole of which the diameter is x μm and a spacing between the hollow holes is y μm.

Figure 30:
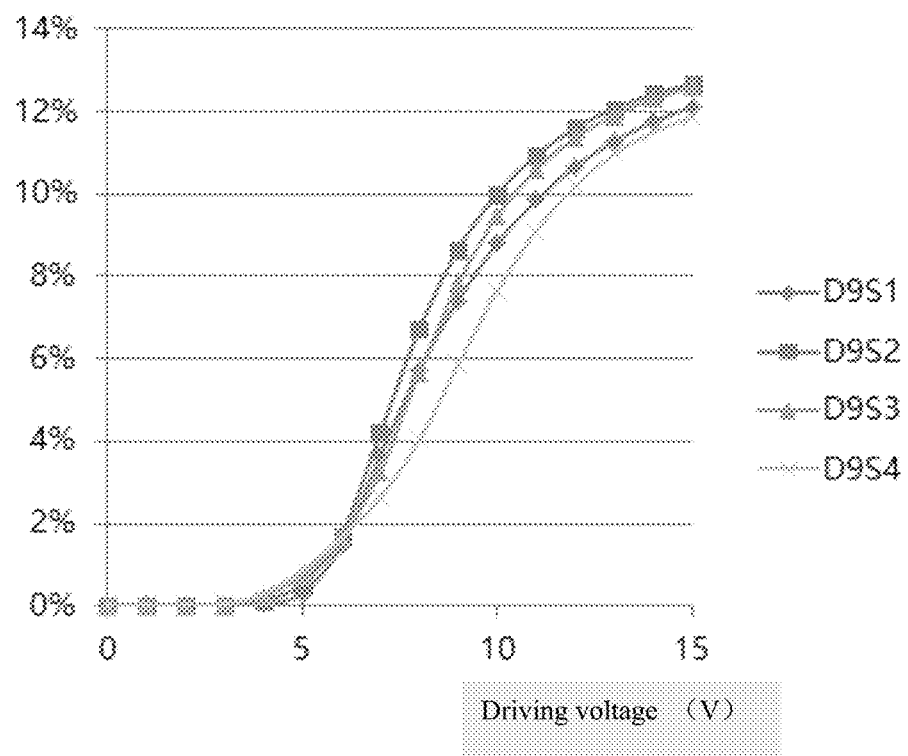
FIG. 30 is a graph of the light transmittance test results of different liquid crystal display panels in an embodiment of the present disclosure.
Figure 31:
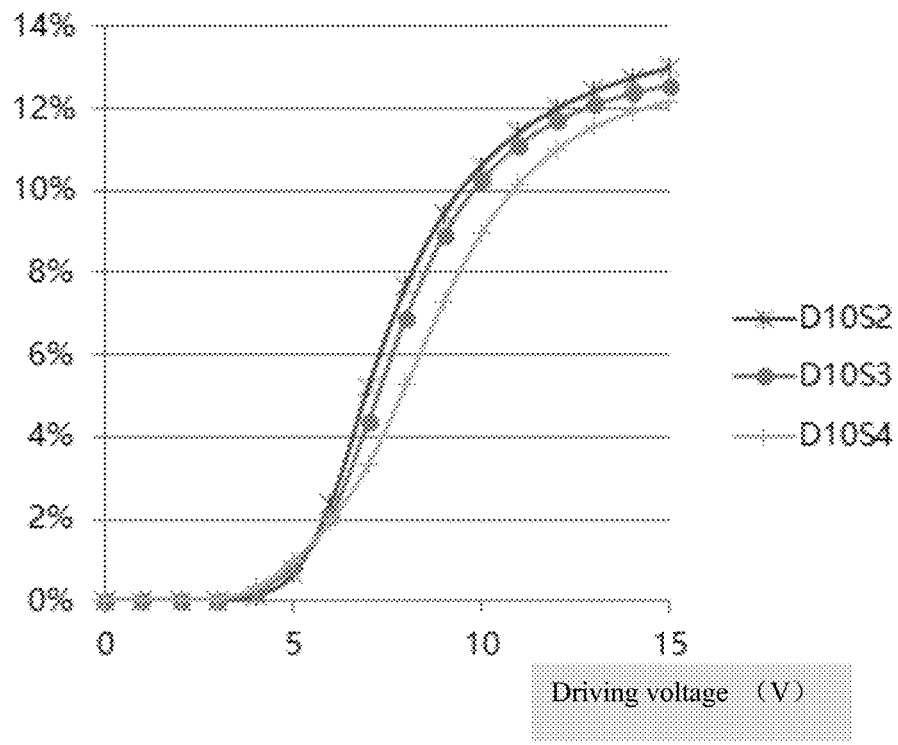
FIG. 31 is a graph of the light transmittance test results of different liquid crystal display panels in an embodiment of the present disclosure.
Figure 32:
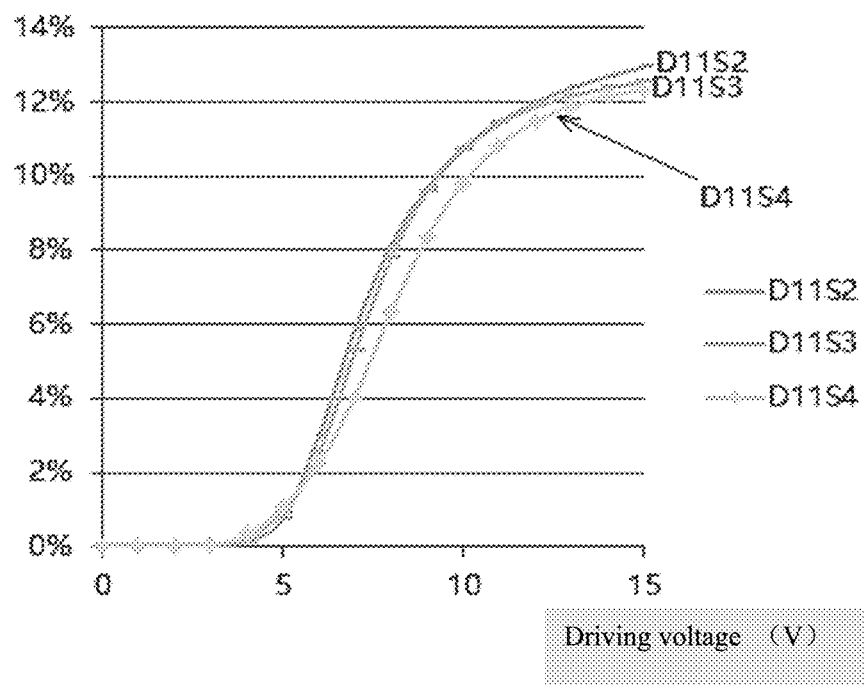
FIG. 32 is a graph of the light transmittance test results of different liquid crystal display panels in an embodiment of the present disclosure.
Figure 33:
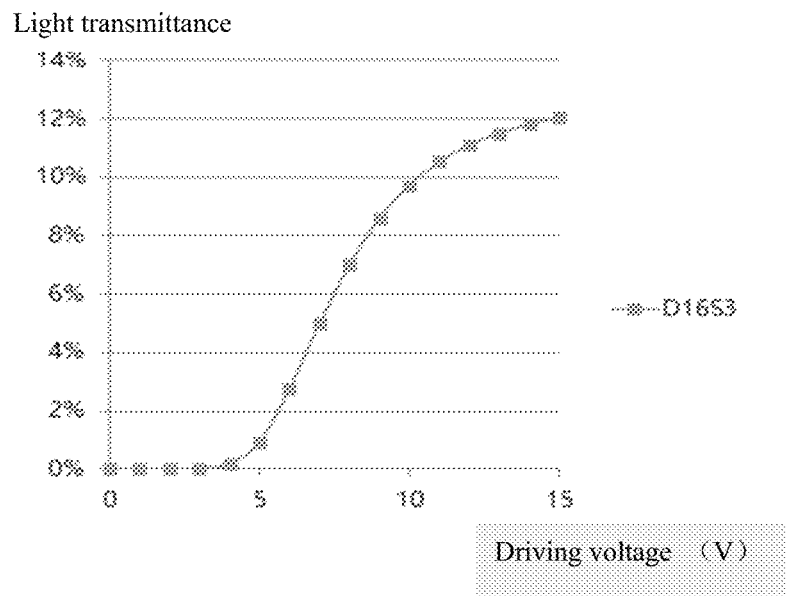
FIG. 33 is a graph of the light transmittance test results of different liquid crystal display panels in an embodiment of the present disclosure.

Refer to FIG. 30 to FIG. 32, in each liquid crystal display panel, when the diameter of the hollow holes 300 is fixed, the liquid crystal display panel with a spacing between the hollow holes 300 of 2 μm has the lowest starting voltage Vth, where, the starting voltage Vth is a voltage loaded on the first electrode 1081 and the second electrode 1082 to cause the liquid crystal to start to fall. When the voltage difference loaded on the first electrode 1081 and the second electrode 1082 is 9V, the liquid crystal display panel with the spacing between the hollow holes 300 of 2 μm has the highest light transmittance. When the voltage difference loaded on the first electrode 1081 and the second electrode 1082 is 15V, the liquid crystal display panel with the spacing between the hollow holes 300 of 3 μm has the highest light transmittance. Combining the data in FIG. 30 to FIG. 33, it can also be found that, when the spacing between the hollow holes 300 is fixed, the larger the diameter of the hollow hole 300, the greater the light transmittance of the liquid crystal display panel. Refer to FIG. 29, when the hollow holes are arranged in an array, the positions of the hollow holes all exhibit obvious four-domain characteristics.

In some embodiments of the present disclosure, each of the hollow holes 300 is in a shape of circle, and the first hollow holes are densely distributed in a regular hexagon. The diameter of each of the hollow holes 300 is in a range of 11 μm to 13 μm, and the distance between the first hollow holes is 2 μm to 4 μm.

Exemplarily, in an embodiment of the present disclosure, the diameter of the hollow hole 300 is 13 μm, and the distance between the centers of two adjacent first hollow holes 301 is 16 μm.

Figure 35:
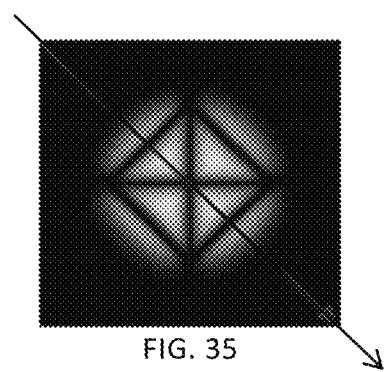
FIG. 35 is a schematic diagram of the light transmittance data collection position in the light transmittance test of the liquid crystal display panel in an embodiment of the present disclosure.

In the present disclosure, it is possible to prepare a liquid crystal display panel in which the second electrode 1082 has only one square hollow hole 300, and test the light transmittance changes of the liquid crystal display panel at different positions on a test reference line. FIG. 35 shows the location of the test reference line, as indicated by the arrow.

Figures 1, 2, 3, 4, 5, 34:
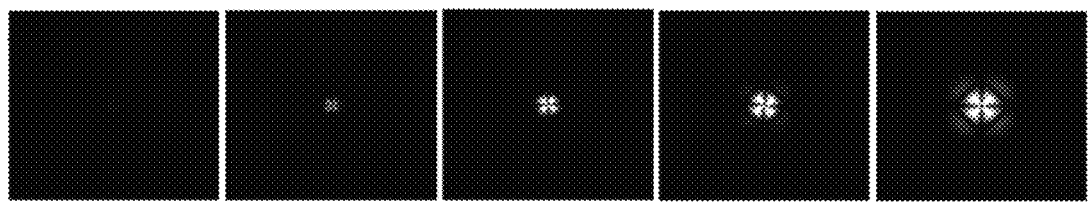
Figures 6, 7, 8, 9, 10, 34:
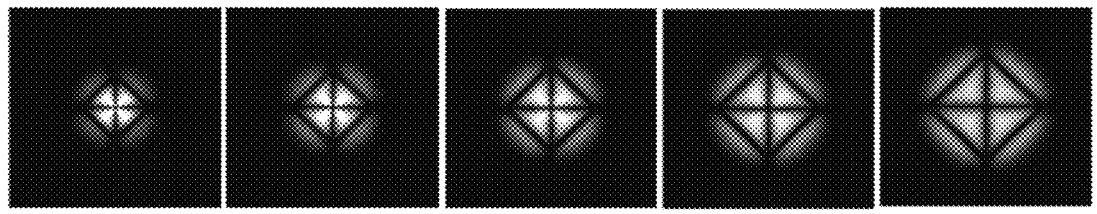

FIG. 34-1 to FIG. 34-10 respectively show the test photos when the hollow holes 300 have different sizes. Among them, FIG. 34-1 is a photo of the test when the length of one edge of the hollow hole is 2 μm; FIG. 34-2 is a photo of the test when the length of one edge of the hollow hole is 4 μm; FIG. 34-3 is a photo of the test when the length of one edge of the hollow hole is 6 μm; FIG. 34-4 is a photo of the test when the length of one edge of the hollow hole is 8 μm; FIG. 34-5 is a photo of the test when the length of one edge of the hollow hole is 10 μm; FIG. 34-6 is a photo of the test when the length of one edge of the hollow hole is 12 μm; FIG. 34-7 is a photo of the test when the length of one edge of the hollow hole is 14 μm; FIG. 34-8 is a photo of the test when the length of one edge of the hollow hole is 16 μm; FIG. 34-9 is a photo of the test when the length of one edge of the hollow hole is 18 μm; FIG. 34-10 is a photo of the test when the length of one edge of the hollow hole is 20 μm. According to these photos, when the length of the edge of the hollow hole is different, the light transmittance of the liquid crystal display panel is different. Refer to FIG. 34-3~FIG. 34-10, the liquid crystal display panel exhibits obvious four-domain characteristics, and there is a phenomenon of phase misalignment between the four domain regions.

Figure 36:
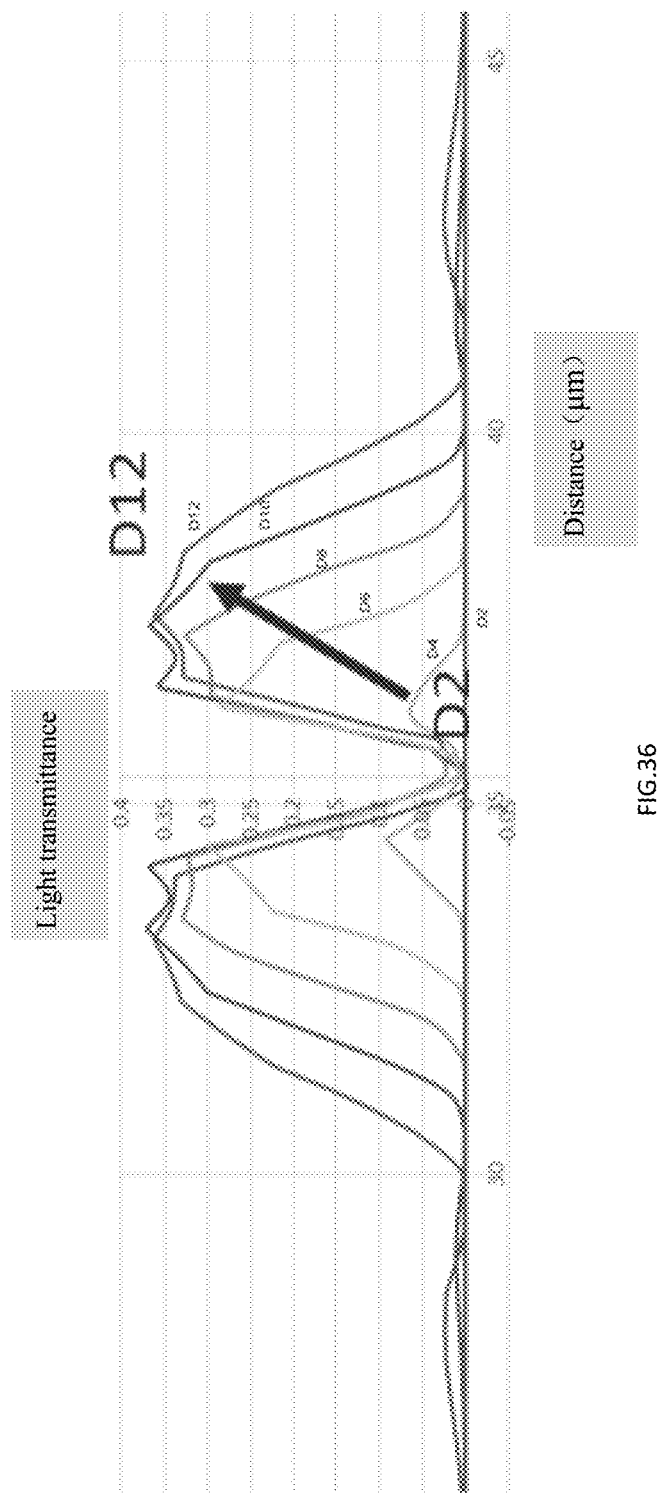
FIG. 36 is a graph of the light transmittance test results of different liquid crystal display panels in an embodiment of the present disclosure.
Figure 37:
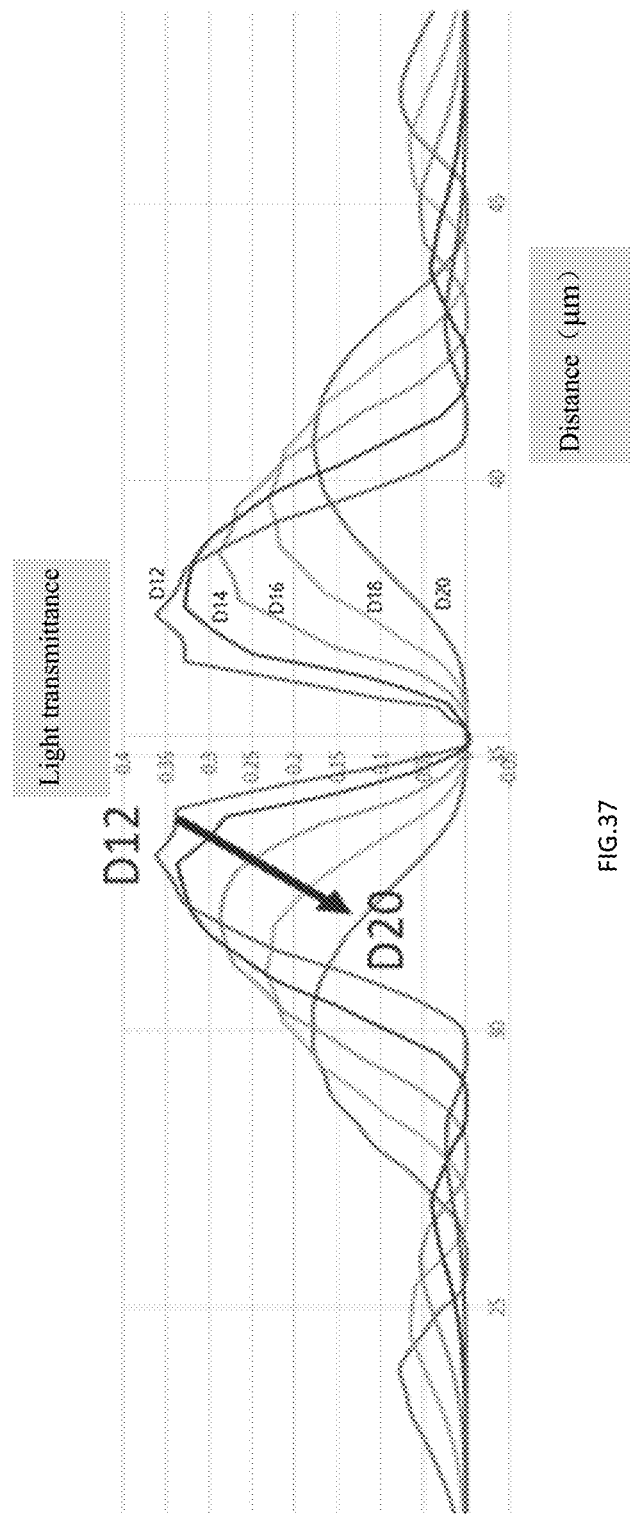
FIG. 37 is a graph of the light transmittance test results of different liquid crystal display panels in an embodiment of the present disclosure.

FIG. 36 shows the change of light transmittance at different positions of the hollow hole when the size of the hollow hole is in the range of 2 to 12 μm; FIG. 37 shows the change of light transmittance at different positions of the hollow hole when the size of the hollow hole is in the range of 12 to 20 μm; In FIG. 36 and FIG. 37, the abscissa distance is the relative distance, which is used to indicate the relative distance between different test positions and the test reference origin; Dx represents the test curve of a hollow hole with an edge length of x micrometers.

According to FIG. 36 and FIG. 37, the maximum light transmittance of the hollow hole 300 increases first and then gradually decreases as the size of the square hollow hole 300 increases. When the length of an edge of the square hollow hole 300 is not greater than 10 μm, the maximum light transmittance of the hollow hole 300 increases as the length of an edge of the square hollow hole 300 increases; when the length of an edge of the circular hollow hole 300 is not less than 12 μm, the maximum light transmittance in the hollow hole 300 decreases as the length of an edge of the square hollow hole 300 increases. When the length of an edge of the square hollow hole 300 is between 10 μm and 12 μm, the maximum light transmittance of the hollow hole 300 exceeds 35%.

Figure 38:
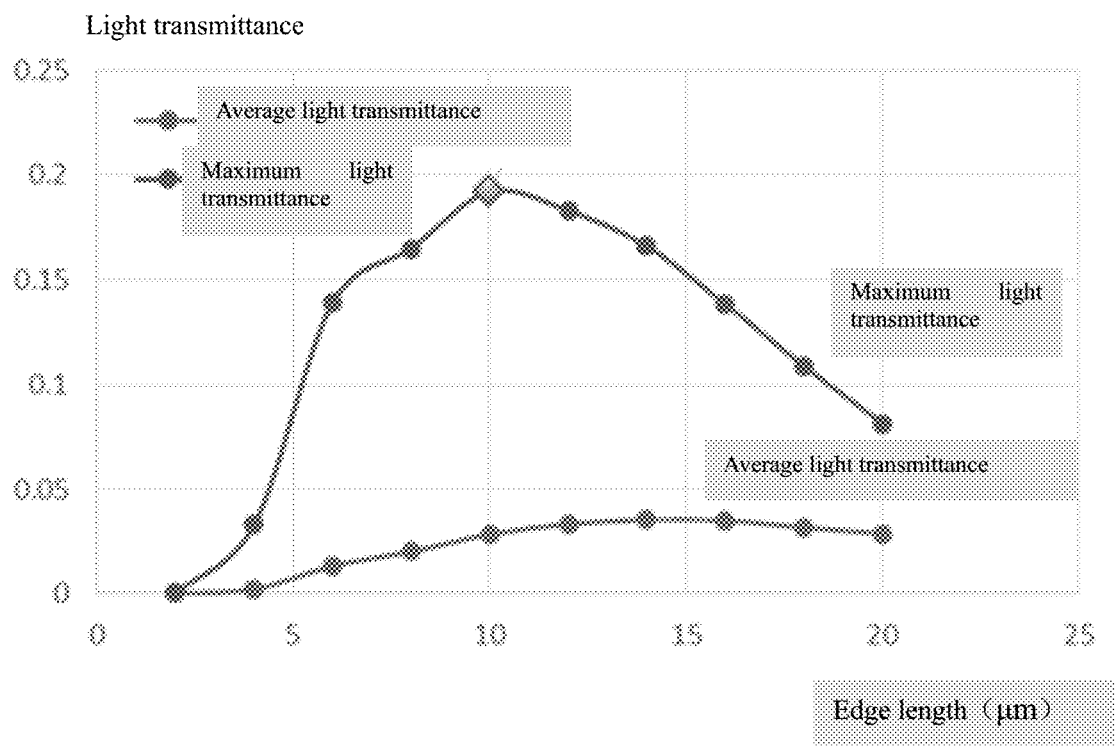
FIG. 38 is a graph of the light transmittance test results of different liquid crystal display panels in an embodiment of the present disclosure.

FIG. 38 shows the average light transmittance of the hollow holes 300 when the hollow holes 300 have different sizes, and the average light transmittance of the liquid crystal display panel when the hollow holes 300 have different sizes. Refer to FIG. 38, when the length of an edge of the square hollow hole 300 is 10 μm, the maximum transmittance of the liquid crystal display panel at the hollow hole 300 reaches the maximum value; and when the length of an edge of the square hollow hole 300 is 8 μm, 12

μm or 14 μm, the average light transmittance of the liquid crystal display panel at the hollow hole 300 is greater than 15%, which is maintained at a relatively high level. When the length of an edge of the square hollow hole 300 reaches more than 10 μm, the growth rate of the overall light transmittance of the liquid crystal display panel decreases as the length of an edge of the square hollow hole 300 increases.

Based on the above test of the liquid crystal display panel provided with a single square hollow hole 300, it can be seen that when the diameter of the square hollow hole 300 is in the range of 9 μm to 13 μm, the liquid crystal display panel can obtain a larger light transmittance in the region provided with the hollow hole 300.

In an embodiment of the present disclosure, the shape of the hollow hole 300 is square, and the diameter of the hollow hole 300 is in the range of 10 μm to 12 μm.

Figure 39:
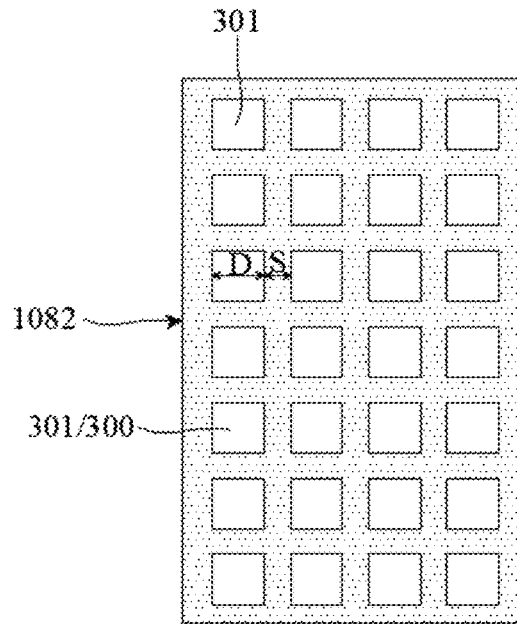
FIG. 39 is a schematic structural diagram of the second electrode of the liquid crystal display panel used for light transmittance test in an embodiment of the present disclosure.

In the present disclosure, a liquid crystal display panel in which the second electrode 1082 has an array of hollow holes 300 can be prepared. Refer to FIG. 39, the shape of the hollow holes 300 is square, and the included angle between the hollow hole row A and the hollow hole column B is 90°. That is, in the liquid crystal display panel, the hollow holes 300 may be densely distributed in a square shape. The liquid crystal display panel used for testing may not be provided with an alignment layer, and the included angle between the upper and lower polarizers of the liquid crystal display panel is 90°.

Figure 40:
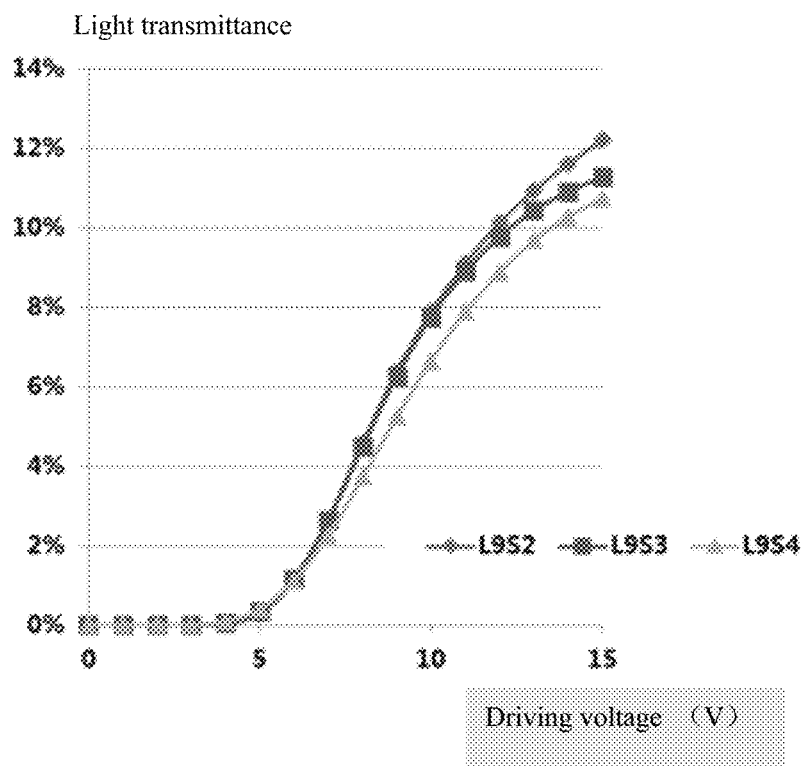
FIG. 40 is a graph of the light transmittance test results of different liquid crystal display panels in an embodiment of the present disclosure.
Figure 41:
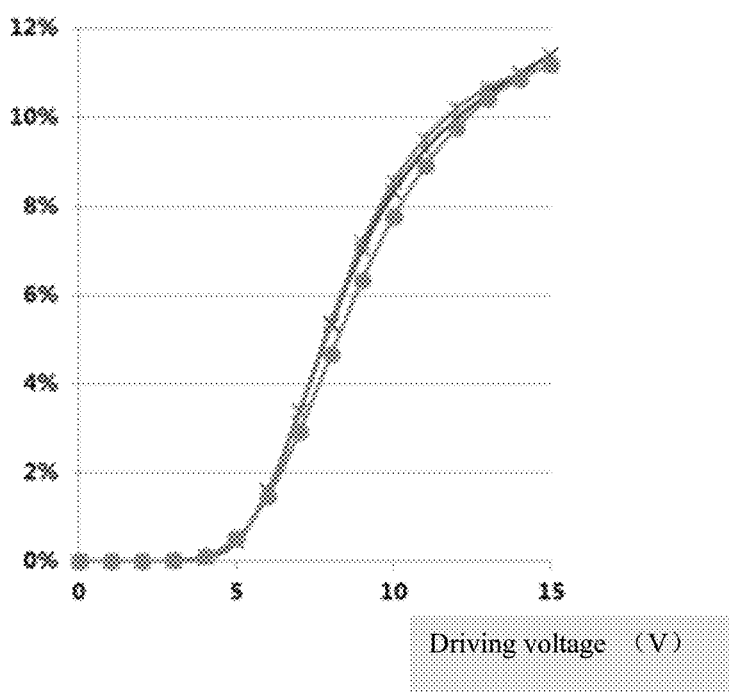
FIG. 41 is a graph of the light transmittance test results of different liquid crystal display panels in an embodiment of the present disclosure.
Figure 42:
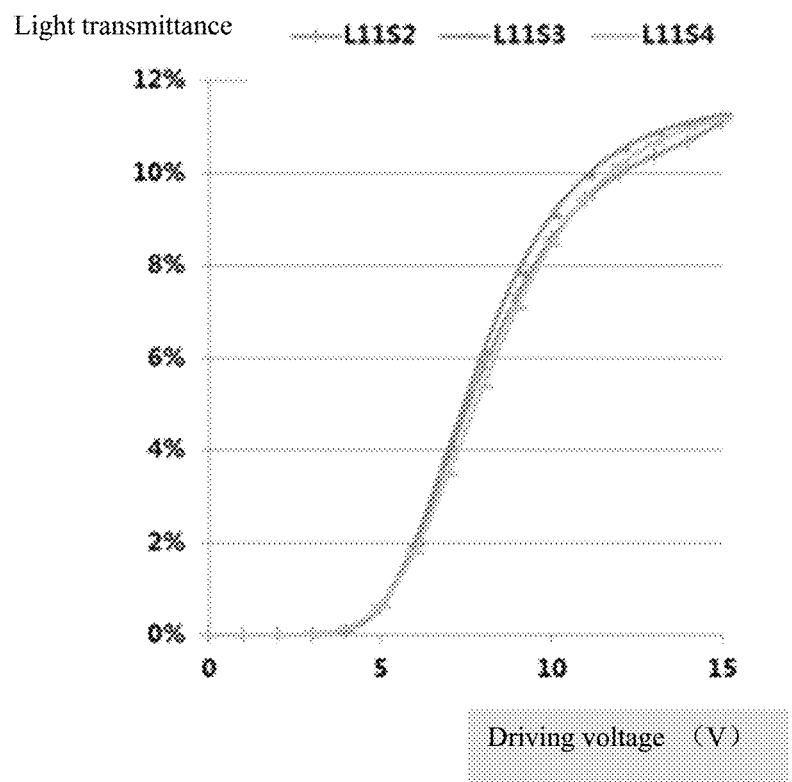
FIG. 42 is a graph of the light transmittance test results of different liquid crystal display panels in an embodiment of the present disclosure.
Figure 43:
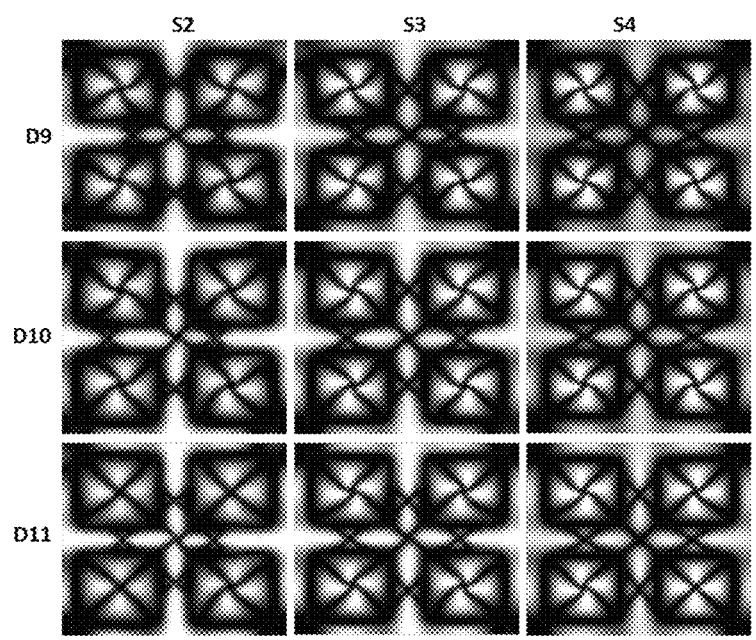
FIG. 43 is a photo of the light transmittance test of different liquid crystal display panels in an embodiment of the present disclosure.

The present disclosure also tests the light transmittance of the liquid crystal display panels under different driving voltages when the liquid crystal display panels have different second electrodes 1082. In FIG. 40 to FIG. 42, DxSy indicates that the diameter D of the hollow holes is x μm and the spacing S is y μm. FIG. 43 shows test photos of liquid crystal display panels with different second electrodes. The photo at the intersection of the Dx row and the Sy column is a test photo of a liquid crystal display panel with a hollow hole diameter of x μm and a hollow hole pitch of y μm.

Refer to FIG. 40 to FIG. 42, in each liquid crystal display panel, when the size of the hollow holes 300 is fixed, the liquid crystal display panel with a spacing between the hollow holes 300 of 2 μm has the lowest starting voltage Vth, where, the starting voltage Vth is a voltage loaded on the first electrode 1081 and the second electrode 1082 to cause the liquid crystal to start to fall. When the voltage difference loaded on the first electrode 1081 and the second electrode 1082 is 9V, the liquid crystal display panel with the spacing between the hollow holes 300 of 2 μm has the highest light transmittance. When the voltage difference loaded on the first electrode 1081 and the second electrode 1082 is 15V, the liquid crystal display panel with the spacing between the hollow holes 300 of 3 μm has the highest light transmittance. Refer to the data in FIG. 40 to FIG. 42, when the spacing between the hollow holes 300 is fixed, the larger the size of the hollow hole 300, the greater the light transmittance of the liquid crystal display panel. Refer to FIG. 43, when the hollow holes are arranged in an array, the positions of the hollow holes all exhibit obvious four-domain characteristics.

In some embodiments of the present disclosure, each of the hollow holes 300 is in a shape of square, and the first hollow holes are densely distributed in a square. The length of an edge of each of the hollow holes 300 is in a range of 9 μm to 11 μm, and the distance between the first hollow holes is 2 μm to 4 μm.

Exemplarily, in an embodiment of the present disclosure, the length of an edge of the hollow hole 300 is 11 μm, and the distance between the centers of two adjacent first hollow holes 301 is 14 μm.

Exemplarily again, in an embodiment of the present disclosure, the length of an edge of the hollow hole 300 is 9 μm, and the distance between the centers of two adjacent first hollow holes 301 is 11 μm.

Figure 44:
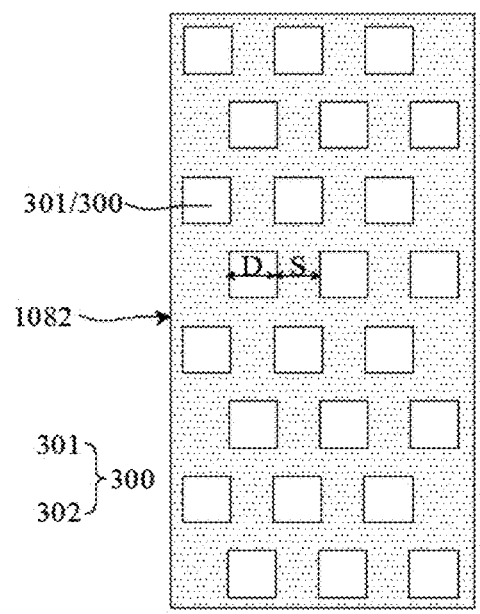
FIG. 44 is a schematic structural diagram of the second electrode of the liquid crystal display panel used for light transmittance test in an embodiment of the present disclosure.

In the present disclosure, a liquid crystal display panel in which the second electrode 1082 has an array of hollow holes 300 can also be prepared. Refer to FIG. 44, the shape of each of the hollow holes 300 is square, and the included angle between the hollow hole row A and the hollow hole column B is 60°. That is, in the liquid crystal display panel, the hollow holes 300 may be densely distributed in a regular hexagon. The liquid crystal display panel used for testing may not be provided with an alignment layer, and the included angle between the upper and lower polarizers of the liquid crystal display panel is 90°.

Figure 45:
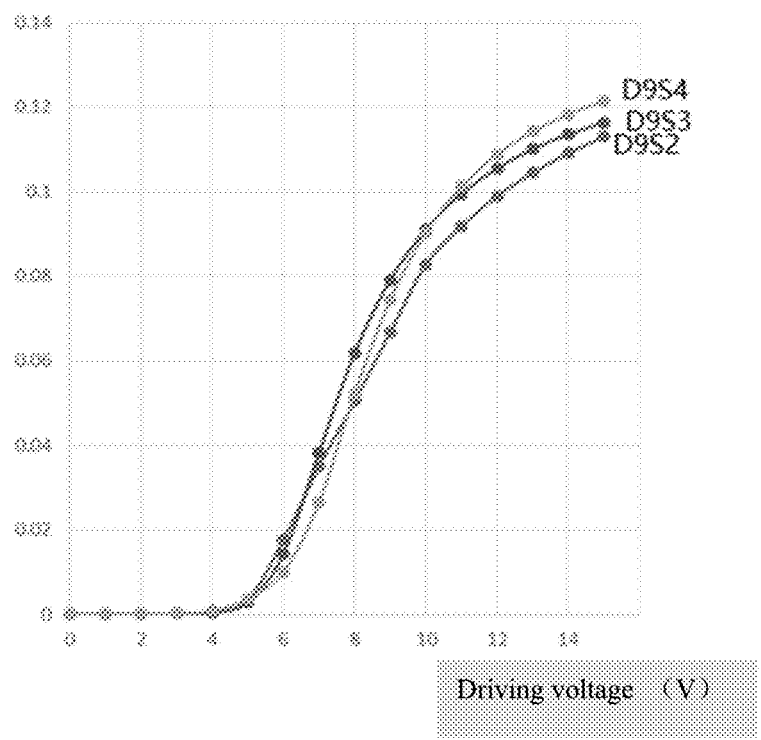
FIG. 45 is a graph of the light transmittance test results of different liquid crystal display panels in an embodiment of the present disclosure.
Figure 46:
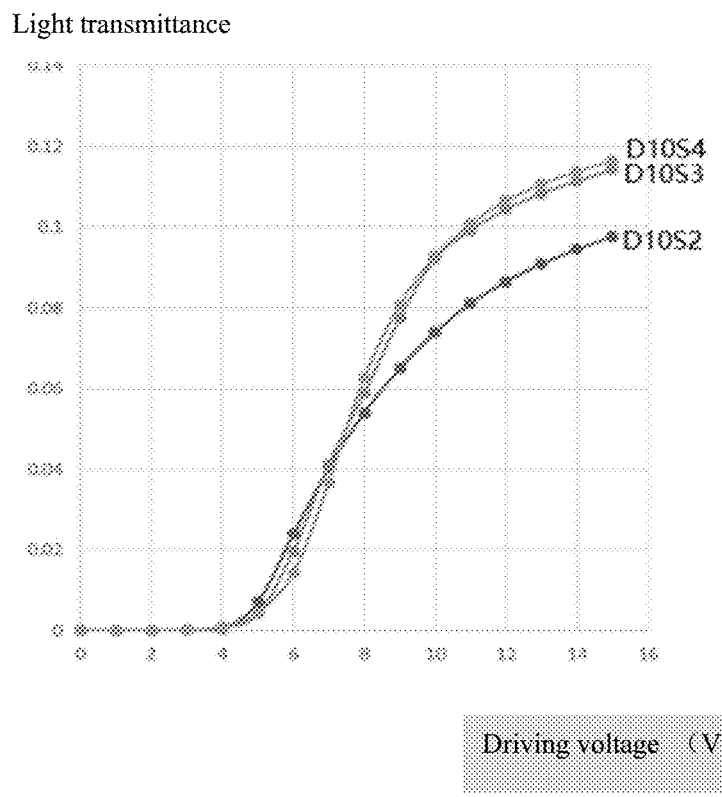
FIG. 46 is a graph of the light transmittance test results of different liquid crystal display panels in an embodiment of the present disclosure.
Figure 47:
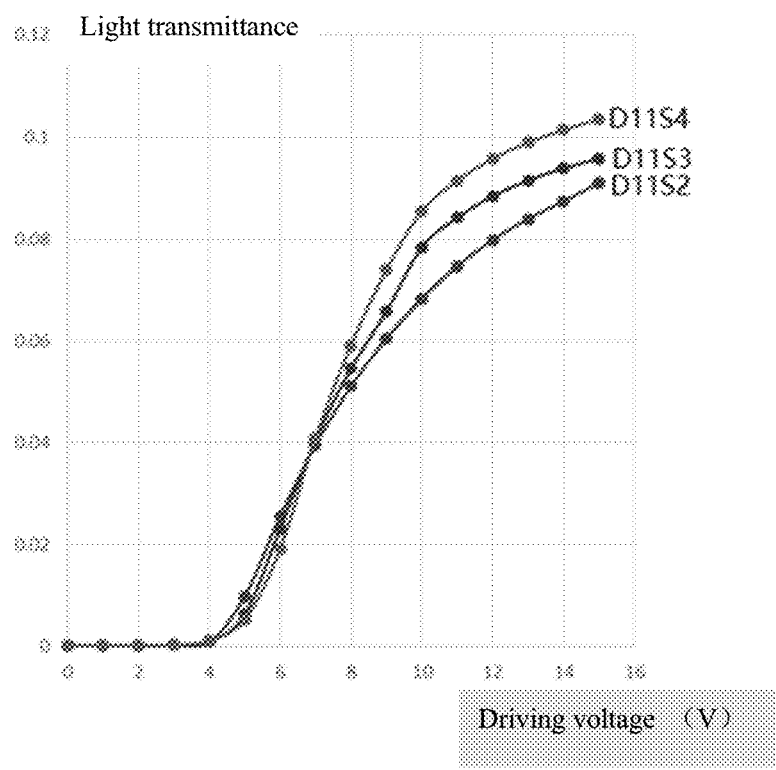
FIG. 47 is a graph of the light transmittance test results of different liquid crystal display panels in an embodiment of the present disclosure.
Figure 48:
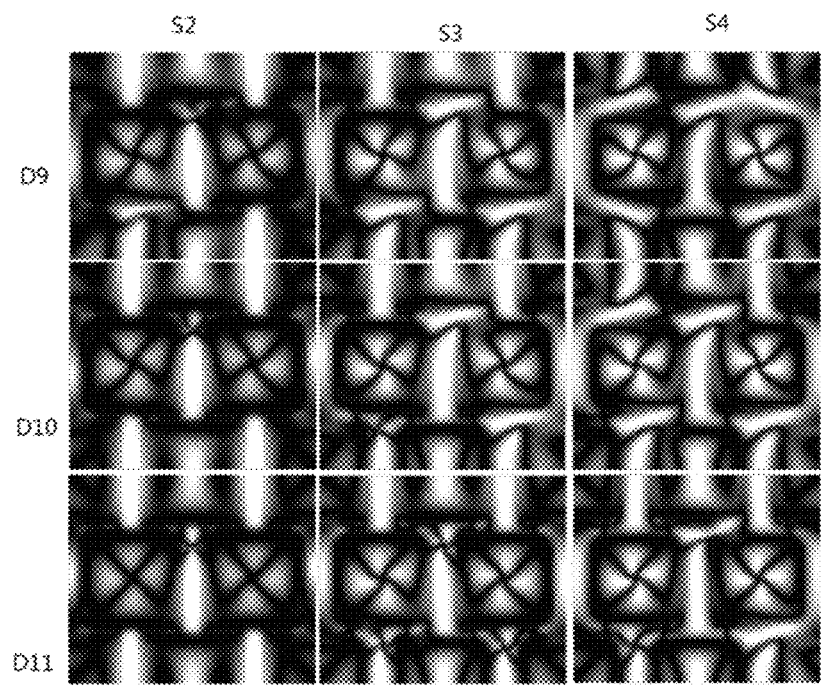
FIG. 48 is a photo of the light transmittance test of different liquid crystal display panels in an embodiment of the present disclosure.

The present disclosure also tests the light transmittance of the liquid crystal display panel under different driving voltages when the liquid crystal display panel has different second electrodes 1082, and the results are shown in FIG. 45 to FIG. 47. Where, in FIG. 45 to FIG. 47, DxSy indicates that the length D of an edge of the hollow holes is x μm and the spacing S is y μm, where, the spacing here is the difference between the length of a line connecting the centers of two adjacent hollow holes and the length of one edge of one hollow hole. FIG. 48 shows test photos of liquid crystal display panels with different second electrodes. The photo at the intersection of the Dx row and the Sy column is a photo shows a liquid crystal display panel with a hollow hole of which the diameter is x μm and a spacing between the hollow holes is y μm.

Refer to FIG. 45 to FIG. 47, in each liquid crystal display panel, when the size of the hollow holes 300 is fixed, the liquid crystal display panel with a spacing between the hollow holes 300 of 2 μm has the lowest starting voltage Vth, where, the starting voltage Vth is a voltage loaded on the first electrode 1081 and the second electrode 1082 to cause the liquid crystal to start to fall. When the voltage difference loaded on the first electrode 1081 and the second electrode 1082 is 9V, the liquid crystal display panel with the spacing between the hollow holes 300 of 2 μm has the highest light transmittance. When the voltage difference loaded on the first electrode 1081 and the second electrode 1082 is 15V, the liquid crystal display panel with the spacing between the hollow holes 300 of 3 μm has the highest light transmittance. Combining the data in FIG. 45 to FIG. 47, it can also be found that, when the spacing between the hollow holes 300 is fixed, the larger the diameter of the hollow hole 300, the greater the light transmittance of the liquid crystal display panel. Refer to FIG. 48, when the hollow holes are arranged in an array, the positions of the hollow holes all exhibit obvious four-domain characteristics.

In some embodiments of the present disclosure, each of the hollow holes 300 is in a shape of square, and the first hollow holes are densely distributed in a regular hexagon. The diameter of each of the hollow holes 300 is in a range of 9 μm to 11 μm, and the distance between the first hollow holes is 2 μm to 4 μm.

Exemplarily, in an embodiment of the present disclosure, the length of an edge of the hollow hole 300 is 10 and the distance between the centers of two adjacent first hollow holes 301 is 13 μm.

In an embodiment of the present disclosure, the hollow hole 300 is in a shape of square; the included angle between an edge of the hollow hole 300 and the first direction C is in the range of 0° to 10°.

In the present disclosure, three different liquid crystal display panels are prepared to test the difference in color deviation between different display panels, and four samples are prepared for each liquid crystal display panel. The first type of liquid crystal display panel is provided with an alignment layer, and the second electrode is a slit electrode. The second type of liquid crystal display panel is not provided with an alignment layer, and the second electrode is provided with hollow holes distributed in an array, and the shape of the hollow hole is circle. The third type of liquid crystal display panel is not provided with an alignment layer, and the second electrode is provided with hollow holes distributed in an array, and the shape of the hollow hole is square.

Figure 49:
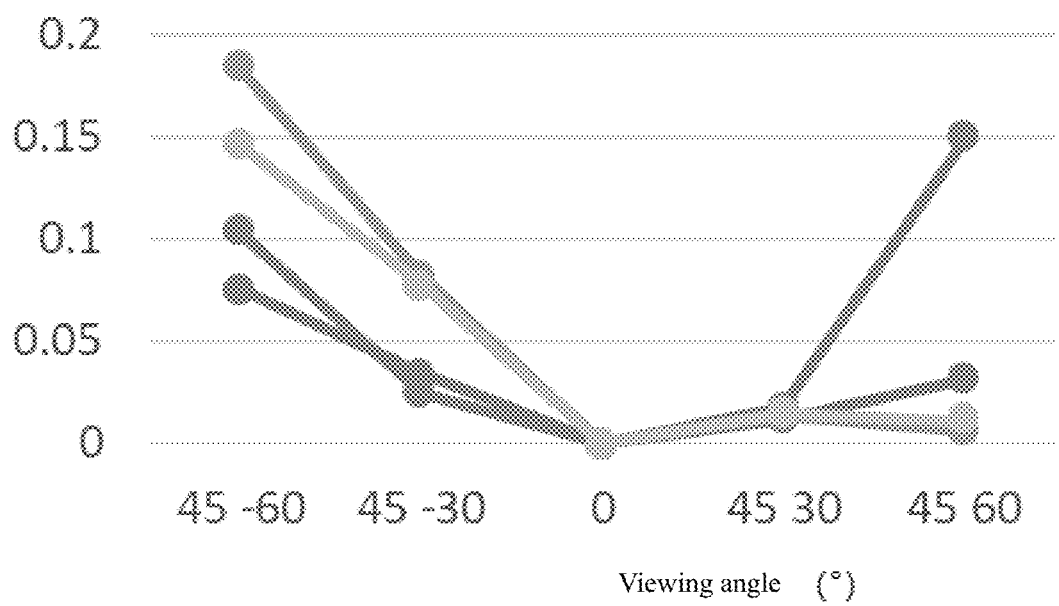
FIG. 49 showing a color deviation test result of a liquid crystal display panel with the second electrode which is a slit electrode in an embodiment of the present disclosure.
Figure 50:
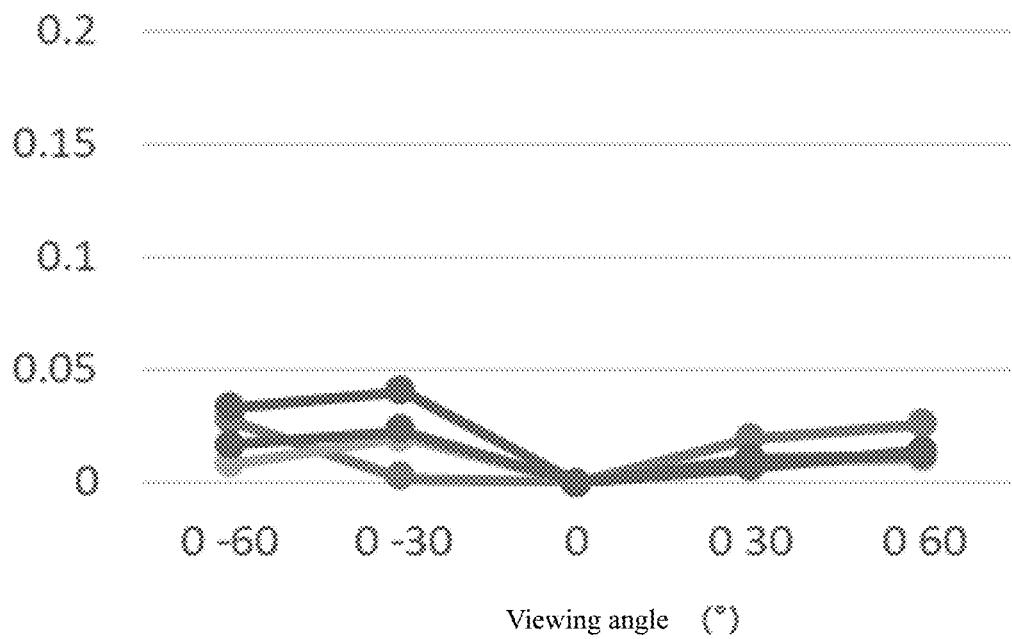
FIG. 50 showing a color deviation test result of a liquid crystal display panel with the second electrode which is provided with a circular hollow hole in an embodiment of the present disclosure.
Figure 51:
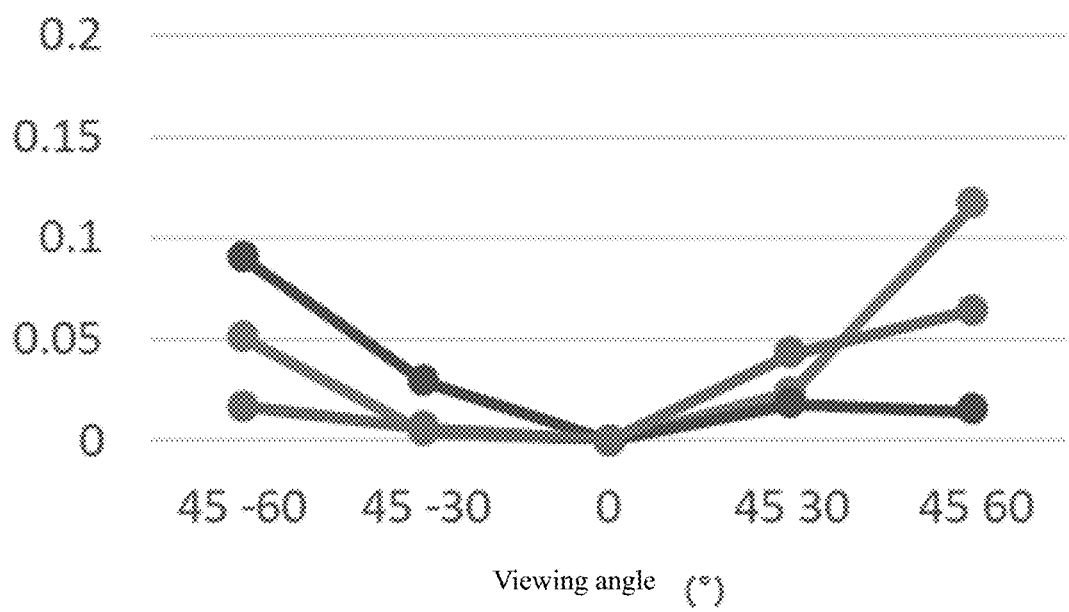
FIG. 51 showing a color deviation test result of a liquid crystal display panel with the second electrode which is provided with a square hollow hole in an embodiment of the present disclosure.

For three different liquid crystal display panels, the color deviation values were tested under different viewing angles, and the results are shown in FIG. 49 to FIG. 51. Among them, FIG. 49 is the test result of the first type of liquid crystal display panel; FIG. 50 is the test result of the second type of liquid crystal display panel; FIG. 51 is the test result of the third type of liquid crystal display panel. Comparing FIG. 49 to FIG. 51, it can be seen that when the second electrode is provided with hollow holes, the liquid crystal display panel has a lower color deviation value, which is about half of the color deviation value of the first type of liquid crystal display panel. Not only that, the color deviation values of the second liquid crystal display panel and the third liquid crystal display panel at different viewing angles on the left and right sides are not much different, but the color deviation values of the first type of liquid crystal display panel at different viewing angles on the left and right sides are large different. This shows that the array substrate provided by the present disclosure can not only avoid the provision of alignment layers, reduce the cost of the liquid crystal display panel and increase the yield, but also reduce the color deviation of the liquid crystal display panel.

Embodiments of the present disclosure also provide a liquid crystal display panel, which includes any one of the array substrates described in the above-mentioned array substrate embodiments. The liquid crystal display panel can be a computer screen, a mobile phone screen or other types of liquid crystal display panels. Since the liquid crystal display panel has any one of the array substrates described in the above-mentioned array substrate embodiments, it has the same beneficial effects, which will not be repeated here in this disclosure.

In an embodiment of the present disclosure, the liquid crystal display panel further includes a color filter substrate, the color filter substrate and the array substrate that are disposed opposite to each other to form a cell; a liquid crystal layer is sandwiched between the array substrate and the color filter substrate.

Optionally, the liquid crystal in the liquid crystal layer is a negative liquid crystal.

Optionally, the liquid crystal display panel is a vertically aligned liquid crystal display panel; when no voltage is loaded between the first electrode and the second electrode, the included angle between the long axis of the liquid crystal molecule in the liquid crystal layer and the plane where the array substrate is located may be 85° to 90°. In an embodiment of the present disclosure, when no voltage is applied between the first electrode and the second electrode, the long axis of the liquid crystal molecule in the liquid crystal layer is perpendicular to the plane where the array substrate is located.

Exemplarily, in an embodiment of the present disclosure, the liquid crystal display panel is a vertically aligned ADS liquid crystal display panel, the liquid crystal display panel can not only have the advantages of wide viewing angle and high light transmittance of ADS display panels, but also have the advantages of high contrast ratio of VA (vertical alignment) display panels, in addition, the liquid crystal display panel can also achieve the effect of multi-domain characteristics by using fringe electric fields in the vertical alignment mode.

Those skilled in the art will easily think of other embodiments of the present disclosure after considering the specification and practicing the disclosure disclosed herein. This application is intended to cover any variations, uses or adaptive changes of the present disclosure, these variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are pointed out by the appended claims.

What is claimed is:

1. An array substrate, comprising: a base substrate, a first electrode, an insulating dielectric layer and a second electrode stacked in sequence; wherein the second electrode is provided with at least one hollow hole, and the hollow hole is in a shape of convex polygon, circle or ellipse;
   wherein the hollow hole comprises first hollow holes, and a distance between two adjacent first hollow holes is in a range of 2 μm to 4 μm; and
   the hollow hole further comprises a second hollow hole, and the second hollow hole is disposed close to an outer edge of the second electrode; a distance between the second hollow hole and an adjacent first hollow hole is smaller than a distance between two adjacent first hollow holes.

2. The array substrate according to claim 1, wherein the hollow hole is in a shape of a regular polygon or a circle.

3. The array substrate according to claim 2, wherein the hollow hole is in a shape of a circle, a diameter of the hollow hole is in a range of 10 μm to 14 μm.

4. The array substrate according to claim 2, wherein the hollow hole is in a shape of a square, a size of an edge of the hollow hole is in a range of 9 μm to 13 μm.

5. The array substrate according to claim 1, wherein the first hollow holes are arranged into at least one hollow hole row, and the hollow hole row comprises a plurality of the first hollow holes successively adjacent and arranged linearly along a first direction; the first direction is parallel to a plane where the base substrate is located.

6. The array substrate according to claim 5, wherein the first hollow holes are arranged into at least one hollow hole column, and the hollow hole column comprises a plurality of the first hollow holes successively adjacent and arranged linearly along a second direction; the second directions is parallel to the plane where the base substrate is located and intersect with the first direction.

7. The array substrate according to claim 6, wherein an included angle between the first direction and the second direction is 90° or 60°.

8. The array substrate according to claim 6, wherein the hollow hole is in a shape of a square; an included angle between an edge of the hollow hole and the first direction is in a range of 0° to 10°.

9. The array substrate according to claim 6, wherein an included angle between the first direction and the second direction is 90°; the hollow hole is in a shape of a square; a length of an edge of the hollow hole is 11 μm, a distance between centers of two adjacent first hollow holes is 14 μm.

10. The array substrate according to claim 6, wherein an included angle between the first direction and the second direction is 90°; the hollow hole is in a shape of a square; a length of an edge of the hollow hole is 9 μm, a distance between centers of two adjacent first hollow holes is 11 μm.

11. The array substrate according to claim 6, wherein an included angle between the first direction and the second direction is 60°; the hollow hole is in a shape of a square; a length of an edge of the hollow hole is 10 μm, a distance between centers of two adjacent first hollow holes is 13 μm.

12. The array substrate according to claim 6, wherein an included angle between the first direction and the second direction is 90°; the hollow hole is in a shape of a circle; a diameter of the hollow hole is 11 μm, a distance between centers of two adjacent first hollow holes is 14 μm.

13. The array substrate according to claim 6, wherein an included angle between the first direction and the second direction is 60°; the hollow hole is in a shape of a circle; a diameter of the hollow hole is 13 μm, a distance between centers of two adjacent first hollow holes is 16 μm.

14. The array substrate according to claim 1, wherein the first hollow holes are arranged into at least one hollow hole row and at least one hollow hole column; the hollow hole row comprises a plurality of first hollow holes that are successively adjacent and arranged linearly along a first direction; the hollow hole column comprises a plurality of first hollow holes that are successively adjacent and arranged linearly along a second direction; the first direction and the second direction are both parallel to a plane of the base substrate and intersect with each other; any second hollow hole and the first hollow holes in the hollow hole row are arranged in a straight line along the first direction, or any second hollow hole and the first hollow holes in the hollow hole column are arranged in a straight line along the second direction.

15. The array substrate according to claim 1, wherein both the first electrode and the second electrode are transparent electrodes.

16. A liquid crystal display panel, comprising:
an array substrate, the array substrate comprising: a base substrate, a first electrode, an insulating dielectric layer and a second electrode stacked in sequence; wherein the second electrode is provided with at least one hollow hole, and the hollow hole is in a shape of convex polygon, circle or ellipse;
a color filter substrate disposed opposite to the array substrate to form a cell;
a liquid crystal layer sandwiched between the array substrate and the color filter substrates;
wherein the hollow hole comprises first hollow holes, and a distance between two adjacent first hollow holes is in a range of 2 μm to 4 μm; and
the hollow hole further comprises a second hollow hole, and the second hollow hole is disposed close to an outer edge of the second electrode; a distance between the second hollow hole and an adjacent first hollow hole is smaller than a distance between two adjacent first hollow holes.

17. The liquid crystal display panel according to claim 16, wherein liquid crystals in the liquid crystal layer are negative liquid crystals.

18. The liquid crystal display panel according to claim 16, wherein when no voltage is loaded between the first electrode and the second electrode, an included angle between a long axis of a liquid crystal molecule in the liquid crystal layer and a plane where the array substrate is located is in a range of 85° to 90°.

* * * * *